US010334534B2

(12) United States Patent
Alpert et al.

(10) Patent No.: US 10,334,534 B2
(45) Date of Patent: Jun. 25, 2019

(54) MULTIUSER UPLINK POWER CONTROL WITH USER GROUPING

(71) Applicant: Intel Corporation, Santa Clara, CA (US)

(72) Inventors: Yaron Alpert, Petah Tikva (IL); Avi Mansour, Haife (IL); Ziv Avital, Haifa (IL); Arik Klein, Givaat Shmuel (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/708,165

(22) Filed: Sep. 19, 2017

(65) Prior Publication Data
US 2019/0090200 A1 Mar. 21, 2019

(51) Int. Cl.
H04W 52/24 (2009.01)
H04W 52/22 (2009.01)
(Continued)

(52) U.S. Cl.
CPC ........ H04W 52/146 (2013.01); H04W 52/24 (2013.01); H04W 52/346 (2013.01); H04B 7/0452 (2013.01)

(58) Field of Classification Search
CPC . H04B 7/0452; H04L 1/0009; H04L 27/2601; H04L 5/0007; H04W 52/143; H04W 52/146; H04W 52/228; H04W 52/242; H04W 52/262; H04W 52/265; H04W 52/362; H04W 52/367
USPC .... 455/69, 522, 13.1, 450, 451, 452.1, 13.4, 455/509, 464, 513, 63.1, 114.2, 115.3, 455/135, 452.2; 370/252, 329, 336; 375/211, 259, 267
See application file for complete search history.

(56) References Cited

U.S. PATENT DOCUMENTS

2002/0155818 A1* 10/2002 Boros ................... H01Q 1/246
  455/67.14
2003/0103476 A1* 6/2003 Choi ................... H04W 52/143
  370/329
(Continued)

FOREIGN PATENT DOCUMENTS

WO 2016011333 A1 1/2016
WO 2016069568 A1 5/2016

OTHER PUBLICATIONS

"DraftStandard for Information technology—Telecommunications and information exchange between systems Local and metropolitan area networks—Specific requirements", IEEE P802.11ax™/D1.2, Apr. 2017, p. 1-490, Part 11: Wireless LAN Medium Access Control (MAC) and Physical Layer (PHY) Specifications, Amendment 6: Enhancements for High Efficiency WLAN, IEEE, New York, USA.

(Continued)

Primary Examiner — Tan H Trinh
(74) Attorney, Agent, or Firm — Viering, Jentschura & Partner MBB

(57) ABSTRACT

Disclosed is a method of multiuser uplink power control comprising receiving a multiuser uplink calibration transmission from a plurality of stations; grouping the plurality of stations into a plurality of subsets based on a subset characteristic; receiving a subset optimization transmission from a first subset according to a subset rule; and calculating a first calibrated coding data rate and a first calibrated target uplink transmit power for a station in the first subset based on the subset optimization transmission.

20 Claims, 18 Drawing Sheets

(51) Int. Cl.
*H04L 1/00* (2006.01)
*H04W 52/14* (2009.01)
*H04W 52/34* (2009.01)
*H04B 7/0452* (2017.01)

(56) References Cited

U.S. PATENT DOCUMENTS

| | | | | |
|---|---|---|---|---|
| 2004/0081123 | A1 | 4/2004 | Krishnan et al. | |
| 2004/0151122 | A1* | 8/2004 | Lau | H04L 1/0002 370/252 |
| 2006/0092870 | A1* | 5/2006 | Kondou | H04W 52/12 370/318 |
| 2007/0054691 | A1* | 3/2007 | Sankar | H04W 52/325 455/522 |
| 2008/0076438 | A1* | 3/2008 | Chang | H04L 1/0003 455/452.2 |
| 2008/0086662 | A1* | 4/2008 | Li | H04L 1/0003 714/704 |
| 2009/0080504 | A1* | 3/2009 | Li | H04B 7/0421 375/220 |
| 2010/0035647 | A1* | 2/2010 | Gholmieh | H04W 52/10 455/522 |
| 2010/0124930 | A1* | 5/2010 | Andrews | H04W 16/10 455/436 |
| 2010/0246705 | A1* | 9/2010 | Shin | H04W 52/146 375/267 |
| 2011/0116400 | A1* | 5/2011 | Park | H04W 52/08 370/252 |
| 2011/0310987 | A1* | 12/2011 | Lee | H04W 52/146 375/259 |
| 2012/0114021 | A1* | 5/2012 | Chung | H04B 7/155 375/211 |
| 2012/0282964 | A1* | 11/2012 | Xiao | H04B 7/024 455/515 |
| 2013/0286959 | A1* | 10/2013 | Lou | H04W 72/04 370/329 |
| 2014/0235289 | A1* | 8/2014 | Imamura | H04W 52/146 455/522 |
| 2014/0269502 | A1* | 9/2014 | Forenza | H04B 17/12 370/328 |
| 2015/0124634 | A1* | 5/2015 | Harel | H04B 7/0671 370/252 |
| 2015/0146654 | A1 | 5/2015 | Chu et al. | |
| 2015/0280797 | A1* | 10/2015 | Li | H04B 7/0452 370/280 |
| 2015/0319700 | A1* | 11/2015 | Oteri | H04W 52/28 455/127.1 |
| 2015/0373650 | A1* | 12/2015 | Gholmieh | H04W 52/244 370/329 |
| 2016/0157266 | A1* | 6/2016 | Wang | H04W 74/004 370/336 |
| 2016/0381688 | A1* | 12/2016 | Hedayat | H04L 27/26 370/329 |
| 2017/0033950 | A1* | 2/2017 | Houghton | H04L 25/0224 |
| 2017/0041118 | A1* | 2/2017 | Liu | H04L 5/14 |
| 2017/0070961 | A1* | 3/2017 | Bharadwaj | H04W 52/228 |
| 2017/0180103 | A1* | 6/2017 | Min | H04L 5/0073 |
| 2017/0181102 | A1* | 6/2017 | Bharadwaj | H04W 52/146 |
| 2017/0181136 | A1* | 6/2017 | Bharadwaj | H04B 7/0452 |
| 2017/0294953 | A1* | 10/2017 | Ghosh | H04B 7/0851 |
| 2017/0310424 | A1* | 10/2017 | Chun | H04L 1/16 |
| 2017/0373789 | A1* | 12/2017 | Huang | H04B 1/38 |
| 2018/0027498 | A1* | 1/2018 | Won | H04W 52/54 |

OTHER PUBLICATIONS

International Search Report based on application No. PCT/US2018/041724, dated Nov. 28, 2018, 17 pages (for informational purpose only).

Xiaofu Ma, "Improving Throughput and Efficiency for WLAN: Sounding, Grouping, Scheduling", dated Oct. 17, 2016, pp. 1-131, Doctoral Dissertations, Doctor of Philosophy in Electrical Engineering (https://vtechworks.lib.vt.edu/handle/10919/73238).

* cited by examiner

MULTIUSER UPLINK POWER CONTROL WITH USER GROUPING

TECHNICAL FIELD

Various aspects relate generally to methods and devices for managing multiuser uplink power control.

BACKGROUND

Wireless communication standard such as IEEE P802.11ax/D1.4 (August 2017) ("802.11ax") permits simultaneous multiuser ("MU") uplink ("UL") transmissions using MU Multiple Input Multiple Output ("MIMO") and Orthogonal Frequency Division Multiple Access ("OFDMA"). 802.11ax discloses an UL power control mechanism to control the transmission power value of each station that participates in the MU UL. 802.11ax does not describe how to achieve desirable UL performance using the power control mechanism.

SUMMARY

A method of and corresponding system for multiuser uplink power control is disclosed, comprising receiving a multiuser uplink calibration transmission from a plurality of stations; grouping the plurality of stations into a plurality of subsets based on a subset characteristic; receiving a subset optimization transmission from a first subset according to a subset rule; and calculating a first calibrated coding data rate and a first calibrated target uplink transmit power for a station in the first subset based on the subset optimization transmission.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which.

DESCRIPTION

Figure 1:
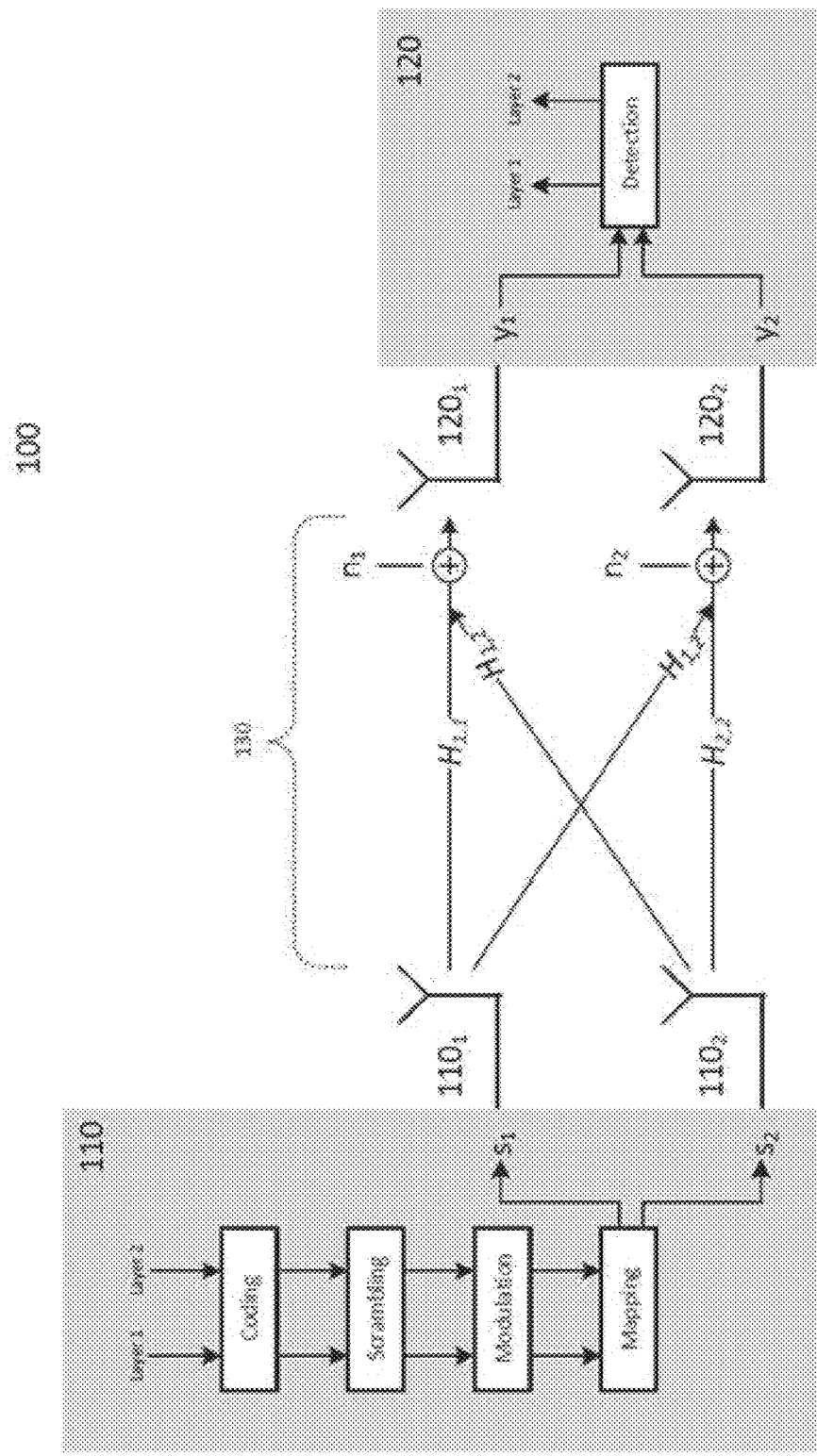
FIG. 1 shows a first arrangement for a MIMO transmission and reception system.

The following detailed description refers to the accompanying drawings that show, by way of illustration, specific details and aspects in which the Disclosure may be practiced.

The word "exemplary" is used herein to mean "serving as an example, instance, or illustration." Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point ("AP") of a mobile communication network may be understood as a macro base station, micro base station, Node B, evolved NodeB ("Enb"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short-Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated UL communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

MIMO Wireless Communication Systems

MIMO systems may employ multiple transmit and receive antennas to transmit multiple data layers on a shared MIMO channel, i.e. a set of shared time-frequency resources. Such MIMO systems may rely on the differing spatial channels between each of the transmit and receive antennas to allow the receiver to individually recover the transmitted data layers from the signals received at the received antennas, which may each be composed of contributions from each transmit antenna that have been altered by noise and other channel effects.

In a MIMO system, each transmit antenna may transmit a separate transmit symbol using the same shared time-frequency resources (e.g. using the same subcarrier or set of subcarriers during a common symbol period). Each receive antenna may then produce a separate receive symbol, where each receive symbol contains a contribution from each transmit symbol that has been altered by the spatial channel between the corresponding receive antenna and each transmit antenna. MIMO receivers may then process the receive symbols to recover the original transmit symbols, which may include applying channel equalization based on channel estimates of each spatial channel in order to individually detect each transmit symbol from the receive symbols. In a multi-subcarrier MIMO case such as for Orthogonal Frequency Division Multiple Access ("OFDMA") or Single Carrier Frequency Division Multiple Access ("SC-FDMA"), each MIMO transmit antenna may transmit a transmit symbol on each of a plurality of subcarriers that collectively compose the shared MIMO channel.

MIMO systems may employ multiple transmitters and/or multiple receivers and/or multiple transceivers, and accordingly may be characterized as Single-User MIMO ("SU-MIMO") or Multi-User MIMO ("MU-MIMO") systems. FIG. 1 shows MIMO system 100, which may be a basic 2×2 SU-MIMO system including MIMO transmitter 110 composed of two transmit antennas $110_1$ and $110_2$ and MIMO receiver 120 composed of two receive antennas $120_1$ and $120_2$. As MIMO channel 130 is shared between a single transmitter (110) and single receiver (120), MIMO system 100 may be classified as an SU-MIMO system.

As shown in FIG. 1, transmitter 110 may transmit two data layers (Layer 1 and Layer 2) on MIMO channel 130 to receiver 120. Transmitter 110 may apply channel coding, scrambling/interleaving, modulation, and antenna mapping on the original data layers to generate transmit symbols $s_1$ and $s_2$ that collectively compose transmit vector $s=[s_1\ s_2]^T$. Transmitter 110 may then transmit each of transmit symbols $s_1$ and $s_2$ via transmit antennas $110_1$ and $110_2$. Transmit symbols $s_1$ and $s_2$ may propagate through MIMO channel 130 and subsequently be received by receive antennas $120_1$ and $120_2$, which may subsequently produce receive symbols $y_1$ and $y_2$ constituting receive symbol vector $y=[y_1\ y_2]^T$. As shown in FIG. 1, both receive symbols $y_1$ and $y_2$ may contain contributions from both transmit symbols $s_1$ and $s_2$, which may be characterized by the channel matrix H of MIMO channel 130 where $H=[h_{1,1}\ h_{1,2};\ h_{2,1}\ h_{2,2}]$ and each $h_{i,j}$ for $i,j=1,2$ is a complex-valued term characterizing the wireless channel response between transmit antenna 110$_j$ and receive antenna 120$_i$. Receiver 120 may recover the original data layers by applying MIMO detection on receive vector y.

Including the contribution from additive noise modeled as $n=[n_1\ n_2]^T$ in MIMO channel 130, MIMO system 100 may be modeled according to H, s, y, and n as follows:

$$y = Hs + n \quad (1)$$

MIMO system 100 and Equation (1) may be analogously expanded to any M×N MIMO system with N transmit antennas (and corresponding transmit symbol vector $s=[s_1, \ldots, s_N]^T$) and M receive antennas (and corresponding receive symbol vector $y=[y_1, \ldots, y_M]^T$), where H denotes the M×N complex channel matrix composed of complex channel response elements $h_{i,j}$, i=1, ..., M, j=1, ..., N, s denotes the complex transmitted symbol vector, n denotes the complex additive noise, and y denotes the complex received noisy symbol vector.

Figure 2:
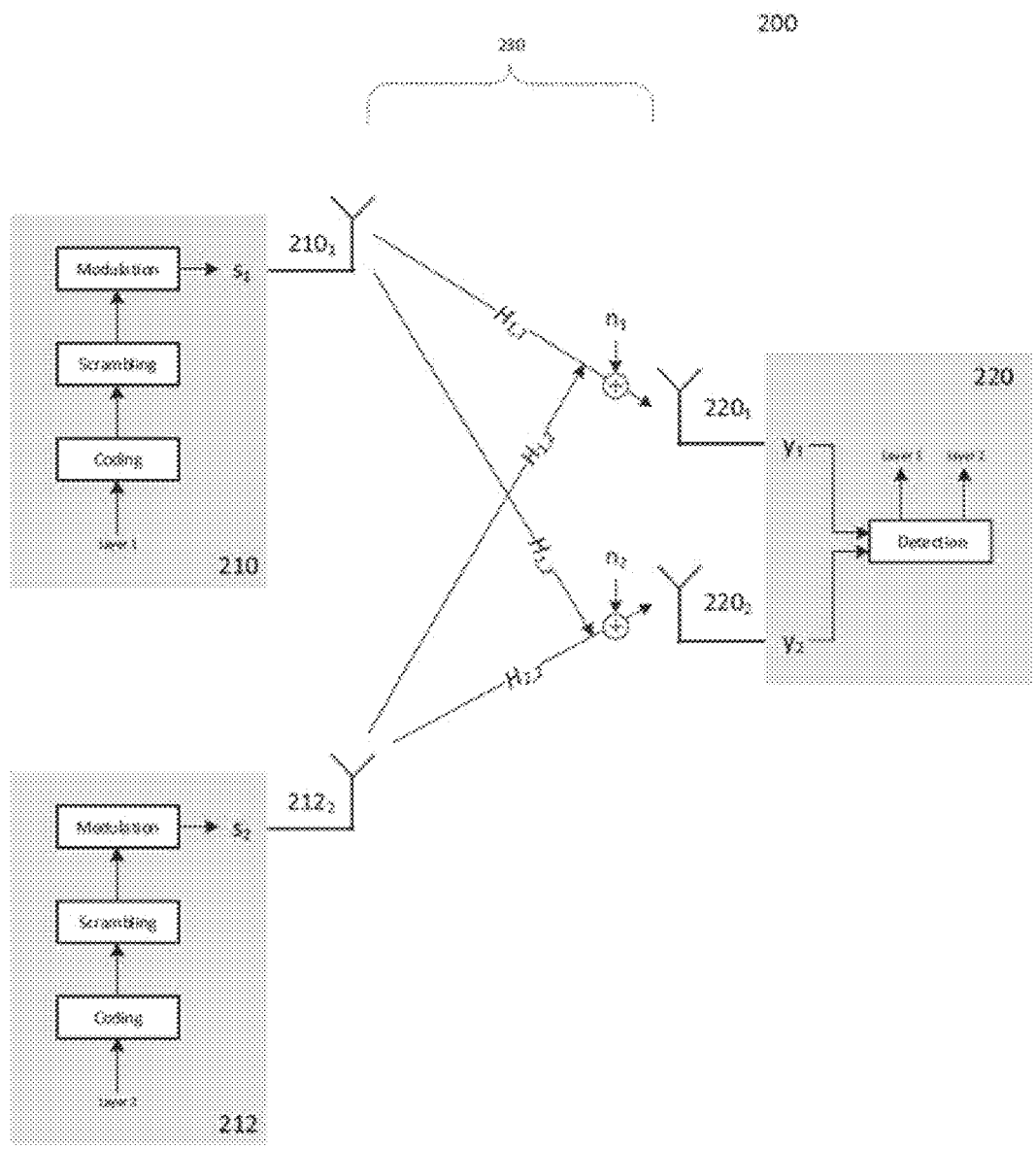
FIG. 2 shows a second arrangement for a MIMO transmission and reception system.

Equation (1) may similarly hold in a MU-MIMO system employing multiple transmitters and/or receivers. FIG. 2 depicts MIMO system 200, which may be an MU-MIMO system including two MIMO transmitters and one MIMO receiver. As opposed to a single transmitter and single receiver each with multiple respective transmit and receive antennas, MU-MIMO system 200 may include two MIMO transmitters 210 and 212 which may each transmit a respective data layer as $s_1$ and $s_2$ over transmit antennas 210$_1$ and 212$_2$, respectively. MIMO receiver 220 may then receive transmit symbols $s_1$ and $s_2$ as noisy receive symbols $y_1$ and $y_2$ following propagation over MIMO channel 230, and may similarly perform MIMO detection on y using a channel matrix H that characterizes MIMO channel 230 to recover the original data layers. Further variations including increasing the total number N and M of transmit and receive antennas (where M≥N), e.g. two transmit antennas at each of MIMO transmitters 210 and 212 and four receive antennas at MIMO receiver 220, reversing the direction (e.g. with a single MIMO transmitter and multiple MIMO receivers), and/or employing both multiple transmitters and multiple receivers to share the MIMO channel are also within the scope of the present disclosure.

As shown in FIGS. 1 and 2, MIMO transmitters may apply one or more of channel coding, scrambling/interleaving, modulation, and antenna mapping/precoding (for a MIMO transmitter with multiple transmit antennas) to the data layers prior to wireless MIMO transmission. The channel coding blocks of MIMO transmitters 110, 210, and 212 may receive a data layer and encode the data layer using a specific coding scheme to produce an encoded digital stream that may allow for a MIMO receiver to correct transmission errors. The scrambling/interleaving blocks may then perform interleaving and/or scrambling in order to re-arrange the bits of the encoded digital stream according to a specific scrambling/interleaving scheme. The modulation blocks may then receive the encoded and scrambled/interleaved digital stream and apply symbol mapping to convert the digital stream into a stream of complex modulation symbols, where each of the modulation symbols represents one or more bits of the encoded and scrambled/interleaved digital stream. If multiple transmit antennas are present, e.g. for MIMO transmitter 110, the antenna mapping block may apply an antenna mapping or precoding scheme to map each complex modulation symbol across the transmit antennas.

Figure 3:
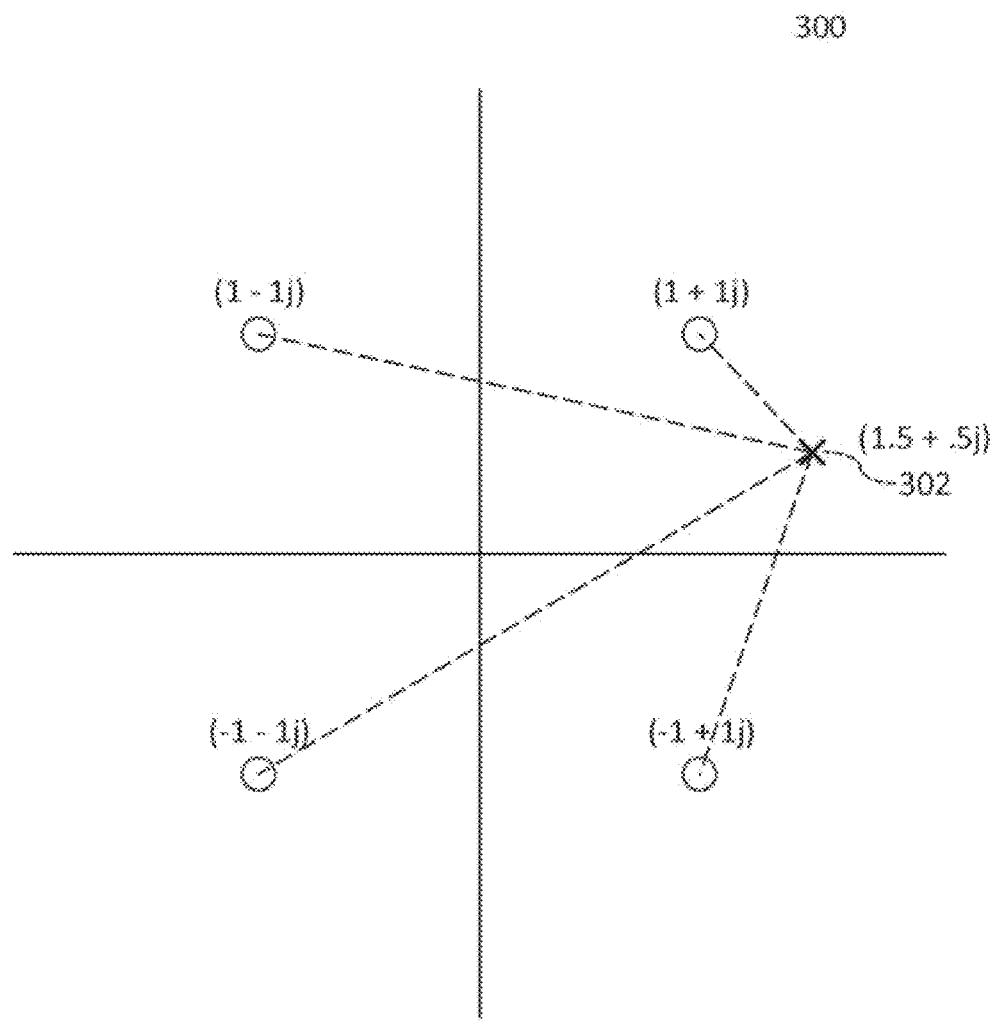
FIG. 3 shows a symbol constellation map.

Each transmit symbol $s_j$, j=1, ..., N, of s and receive symbol $y_i$, i=1, ..., M, of y may thus be a complex-valued symbol according to the particular modulation scheme employed by MIMO system 100, where the receive symbols of y may be corrupted by channel effects and noise. FIG. 3 shows constellation diagram 300 illustrating constellation points (+1−1j), (+1+1j), (−1−1j), and (−1+1j) for a 4-Quadrature Amplitude Modulation ("4-QAM") scheme, where each constellation point may be a complex number with a real and imaginary component. The set of constellation points may be denoted as constellation $\mathcal{M}$, where $\mathcal{M} = \{+1-1j, +1+1j, -1-1j, -+1j\}$ for the 4-QAM scheme depicted in FIG. 3. An analogous set of constellation points $\mathcal{M}$ may similarly be given for any modulation scheme, where the particular constellation points of $\mathcal{M}$ will depend on the specific characteristics of the modulation scheme. Symbol vector s may thus be a vector of N symbols, where each symbol corresponds to a particular constellation point of $\mathcal{M}$, i.e. $s \in \mathcal{M}^N$.

A modulation block such as depicted in MIMO transmitters 110, 210, and 212 may receive a stream of digital input bits, partition the digital stream into blocks, and map each blocks to a constellation point to produce a corresponding complex symbol for each block. In the exemplary 4-QAM case depicted in FIG. 3, a modulator may partition a digital stream into two-bit blocks and map each two bit block ($b_1 b_2$) to constellation $\mathcal{M}$ as $$(00) \rightarrow (1+1j)$$

$$(01) \rightarrow (1-1j)$$

$$(10) \rightarrow (-1+1j)$$

$$(11) \rightarrow (-1-1j) \quad (2)$$

The modulator may thus map the digital input stream to a stream of complex modulation symbols, where each modulation symbol represents one or more bits of the digital input stream according to the block size. Such complex modulation symbols (after precoding, if applicable) may be subsequently modulated on in-phase and quadrature ("IQ") carriers according to the respective real and imaginary parts of each modulation symbol and transmitted as transmit vector s over the transmit antennas.

MIMO receivers such as MIMO receivers 120 and 220 may thus seek to recover the individual data layers of s from the noisy receive symbols of y obtained at receive antennas 120$_i$. MIMO receiver 120/220 may perform such MIMO detection by applying a MIMO equalization ("EQ") filter derived from the channel estimates for the individual spatial channels of H. Specifically, MIMO receiver 120/220 may obtain a channel estimate for each spatial channel of H and generate a MIMO EQ filter that MIMO receiver 120/220 may apply to receive vector y in order to recover an estimate ŝ for s. Application of such a MIMO EQ filter may thus allow a MIMO receiver to isolate an estimate for each transmit symbol of s from the receive symbols of y, thus "detecting" the original transmit symbols and enabling MIMO receiver 120/220 to recover the original data layers.

MIMO receiver 120/220 may perform MIMO detection using any of a number of different algorithms.

Linear MIMO detectors such as zero-forcing ("ZF") and Minimum Mean Square Error ("MMSE") detectors may be used to perform MIMO detection. For such linear detectors, MIMO receiver 120/220 may obtain a MIMO EQ filter matrix W any apply W to y as follows to obtain estimated transmit vector ŝ as $$\hat{s} = Wy \quad (3)$$

where W is a matrix characterizing a linear filter operation.

ZF and MMSE detectors may differ in the selection of the linear transformation matrix W, which in both cases may involve a linear manipulation of channel matrix H. In a ZF and an MMSE detector, W is given as follows:

$$W^{ZF} = (H^H H)^{-1} H^H \quad (4)$$

$$W^{MMSE} = (H^H H + \sigma^2 I_N)^{-1} H^H \quad (5)$$

respectively, where $A^H$ denotes the Hermitian transpose of A, $\sigma^2$ is the noise variance, and $I_N$ denotes the N×N identity matrix. $W^{MMSE}$ may be written as either $W^{MMSE} = (H^H + \sigma^2 I_N)^{-1} H^H)$ or $W^{MMSE} = H^H (HH^H + N\sigma^2 I_N)^{-1}$.

Although either MMSE or ZF may be used for linear detection, they do not correct for phase shift, and therefore, and especially in a 5G context, they will yield results that must be subject to additional computation to assess and correct for phase shift.

Figure 4:
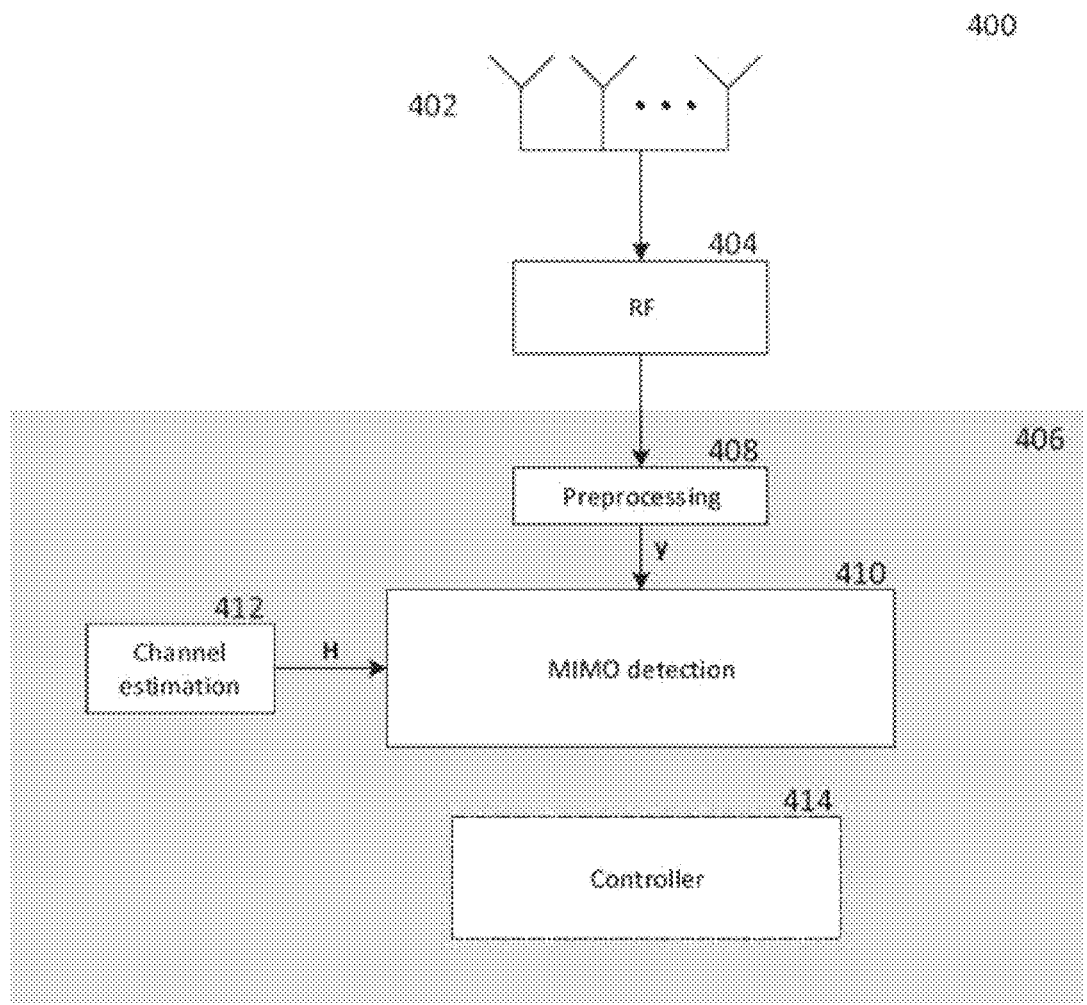
FIG. 4 shows a MIMO receiver device.

FIG. 4 shows an internal configuration of MIMO receiver 400. As shown in FIG. 4, MIMO receiver 400 may include antenna array 402, radio frequency ("RF Frontend") processing circuit 404, and baseband processing circuit 406, which may be composed of preprocessing circuit 408, MIMO symbol detection circuit 410, channel estimation circuit 412, and baseband control circuit 414.

MIMO receiver 400 may be realized in a wireless communication device. In a cellular communication context, MIMO receiver 400 may be implemented as either a downlink MIMO receiver or an UL MIMO receiver. In a downlink MIMO receiver implementation, MIMO receiver 400 may be implemented at a mobile terminal and may receive downlink MIMO signals from one or more base stations over a cellular communication network, such as e.g. on a shared OFDM MIMO channel in which shared discrete subcarriers compose the MIMO channel. MIMO receiver 400 may thus be contained in a single device, e.g. a mobile phone or similar mobile terminal device. Alternatively, in an UL MIMO receiver implementation, MIMO receiver 400 may be implemented at a base station and may receive UL MIMO signals from one or more mobile terminals, e.g. on a shared Single Carrier Frequency Division Multiple Access ("SC-FDMA") MIMO channel that similarly employs shared discrete subcarriers for the MIMO channel after UL SC-FDMA symbols have been spread across the shared subcarriers. In such an UL MIMO context, MIMO receiver 400 may be implemented as part of a distributed base station architecture where the individual components of MIMO receiver 400 depicted in FIG. 4 may be distributed between an antenna array (containing antenna array 402), a Remote Radio Unit (RRU; containing RF processing circuit 404 and optionally preprocessing circuit 408), and a Baseband Unit (BBU; containing baseband processing circuit 406 optionally absent preprocessing circuit 408). MIMO receiver 400 may alternatively be implemented as part of a Cloud-RAN base station architecture in which baseband processing circuit 406 is implemented at a centralized location serving numerous the RRUs from numerous different base stations. MIMO receiver 400 as detailed herein is thus not limited to any particular UL/downlink context or device architecture. MIMO receiver 400 may include one or more additional components such as additional hardware, software, or firmware elements including processors/microprocessors, controllers/microcontrollers, memory, other specialty or generic hardware/processors/circuits, etc., in order to support a variety of additional operations. In particular in the context of a mobile terminal device, MIMO receiver 400 may be included in a mobile terminal device that also includes a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc., which may be further controlled by a central processing element such as a mobile Application Processor ("AP").

Expanding on the abridged description presented above regarding MIMO receiver operation of receiver 120/220, MIMO receiver 400 may be configured to receive wireless signals, such as according to a particular network access protocol or radio access technology ("RAT") including any of LTE, WLAN/WiFi, UMTS, GSM, Bluetooth, CDMA, W-CDMA, etc. Antenna array 402 be composed of M antennas in accordance with an M×N MIMO system, where each antenna may receive wireless radio frequency signals and provide resulting electrical signals to RF processing circuit 404. RF processing circuit 404 may include various reception circuitry components, which may include analog circuitry configured to process externally received signals such as e.g. mixing circuity to convert externally received RF signals to baseband and/or intermediate frequencies. RF processing circuit 404 may also include amplification circuitry to amplify externally received signals, such as power amplifiers ("PAs") and/or Low Noise Amplifiers ("LNAs"). RF processing circuit 404 may be a transceiver component, and accordingly may also be configured to transmit wireless signals via antenna array 402 including e.g. MIMO transmission. However, for purposes of explanation the receive chain will be of primary focus herein.

Baseband processing circuit 406 may be configured to establish and support connections with one or more network terminals (e.g. mobile terminals or base stations depending on an UL or downlink context) by transmitting and receiving wireless signals over a particular wireless communication network according to corresponding network protocols. Baseband control circuit 414 may be configured to control the various components of baseband processing circuit 406 according to particular protocol stack of the wireless communication network, and accordingly baseband control circuit 414 may be protocol processor (e.g. microprocessor) configured to execute protocol stack software and/or firmware modules by retrieving corresponding program code from a baseband memory (not explicitly shown in FIG. 4) and operate in accordance with control logic provided by the protocol stack software and/or firmware modules. Baseband control circuit 414 may thus be configured to execute Layer 1 (Physical or "PHY" layer), Layer 2, and Layer 3 protocol stack software and/or firmware modules and may further control other components of baseband processing circuit 406 including PHY layer hardware of MIMO detection circuit 410, channel estimation circuit 412, preprocessing circuit 408, RF transceiver 404, and antenna array 402 in accordance with the protocol stack software and/or firmware modules.

RF processing circuit 404 may provide baseband processing circuit 406 with M separate analog data streams, where each i-th data stream corresponds to the i-th antenna of antenna array 402. Baseband processing circuit 406 may first preprocess the M analog data streams at preprocessing circuit 408, which may include analog-to-digital conversion and preliminary demodulation to produce receive vector y.

In a multi-subcarrier MIMO context, preprocessing circuit 408 may produce a receive vector y for each subcarrier, where each receive vector y contains the noisy receive symbols received on the corresponding subcarrier. For example, in an LTE context preprocessing circuit 408 may apply a Fast Fourier Transform ("FFT") as part of the preliminary demodulation processing for OFDM (downlink) or SC-FDMA (UL). As OFDM and SC-FDMA MIMO may include sharing multiple discrete subcarriers that each contain a transmit symbol, preprocessing circuit 408 may produce a separate receive vector y containing M complex noisy received symbols for each subcarrier shared as part of the MIMO channel. Accordingly, the relationship of Equation (1) may be re-expressed as $$y_k = H_k s_k + n_k, \; k=1, \ldots, N_{SC} \tag{6}$$

where $N_{SC}$ is the number of subcarriers of the shared MIMO channel (e.g. where $N_{SC}=1$ in a single subcarrier case or $N_{SC}>1$ in a multi-subcarrier case) and $y_k$, $H_k$, $s_k$, and $n_k$ respectively are the receive vector, channel matrix, transmit vector, and noise vector for the k-th subcarrier of the shared MIMO channel. MIMO receiver 400 may thus apply MIMO detection to the receive vector $y_k$ for each subcarrier to recover an estimate $\hat{s}_k$ for the original transmit symbols transmitted by the MIMO transmitters on each subcarrier. While the following description assumes the same number of data layers per MIMO subcarrier, such may be further configured to utilize different numbers of data layers per MIMO subcarrier.

MIMO detection circuit 410 may thus apply MIMO detection to the receive vector $y_k$ for each subcarrier to recover an estimate $\hat{s}_k$ for the original transmit symbols transmitted by the MIMO transmitters on each subcarrier, thus allowing MIMO detection circuit 410 to recover the original data layers as transmitted by the MIMO transmitters. As receive vector $y_k$ includes complex symbols from a single symbol period, preprocessing circuit 408 may produce such a receive vector $y_k$ for each symbol period (for each subcarrier) over an extended duration of symbol periods to reflect continuing reception of MIMO signals by antenna array 402 and RF transceiver 404. MIMO receiver 400 may thus continuously perform decoding of each received vector $y_k$ over an extended period of time as detailed below for receive vectors $y_k$ in a single symbol period.

To the extent that a base station is discussed infra, the full term "base station" will be used. Hereinafter the single word "station" will be used to refer to any device being capable of communicating according to an 802.11 standard, or a device capable of communicating in a MU UL MIMO environment. Such a station will be abbreviated hereinafter as "STA".

It is generally known to perform an initial STA uplink power control calibration procedure before MU UL. During such a calibration procedure, 12 UL Single User ("SU") Physical Protocol Data Units ("PPDU") are triggered from one or more STAs, wherein each STA is asked to transmit its maximal power for each Modulation and Coding Scheme Index ("MCS") ranging from 0 to 11. The received transmit powers for each MCS are saved. For each STA, the AP selects a specific MCS and instructs the STA to transmit using that MCS with a specific target received power. The STA must then estimate the path loss from the trigger packet that includes the information of the AP transmit power, set its transmitter power accordingly, and report its power headroom to the AP. The result is an initial calibration, which yields an UL transmit power and MCS for each station. These initially calibrated UL transmit power settings are not generally sufficiently optimized for a MU UL environment. The following figures describe method of optimization of the initially calibrated UL transmit power settings for use in a MU UL environment.

Figure 5:
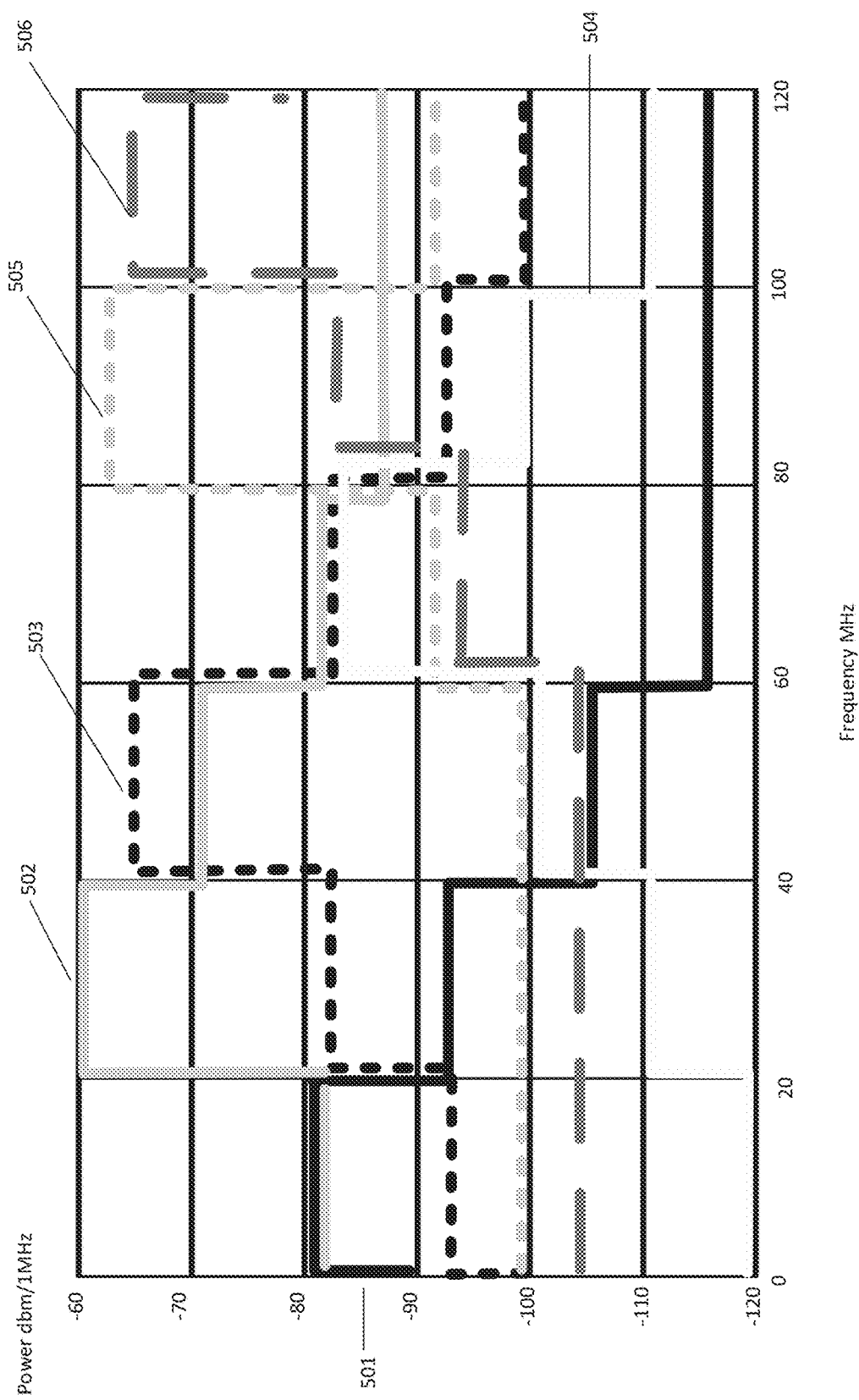
FIG. 5 shows a MU UL without transmit power control.

FIG. 5 shows an OFDMA-based MU UL without transmit power control. OFDMA is principally a multiple-user version of the OFDM modulation scheme. In OFDMA, subsets of subcarriers are assigned to individual users, which permits multiple-user access. By assigning a plurality of individual users with a subset of the subcarrier, the plurality of individual users become capable of simultaneous UL transmission. FIG. 5 depicts UL OFDMA transmissions of six STAs, wherein each of the six STAs is assigned a different frequency range, i.e., Resource Units (hereinafter ("RU"), corresponding to a portion of the bandwidth, for UL OFDMA transmission. The OFDMA transmissions of the six STAs are depicted as solid or dotted lines, ranging from 501 to 506. The transmission of each STA includes transit masks at adjacent RUs, which are depicted as terraced decay from the peak visual representation of the transmission, which may function as spillover into other adjacent RUs that are allocated to other STAs. The spillover functions as interference for other STAs during a MU UL. Due to this spillover effect, the various STAs create mutual interferences owing from the alternate channel noise/transit masks as functions of the adjacent RU. In this case, the RUs assigned to a given STA receive interference from most or all other simultaneously transmitting STAs in adjacent RUs. In many instances, the interference from other STAs is sufficiently high-powered that it may cause decoding errors at the AP due to alternate channel noise rise. For example, STA 503 is depicted as transmitting at approximately −65 dbm/MHz, and simultaneously transmitting STA 502 is transmitting interference in the same frequency range as STA 503 at approximately −72 dbm/MHz. As depicted, the noise from simultaneously transmitting MU UL STAs reduces signal-to-noise ratio and decreases the likelihood of successful decoding at the AP.

Figure 6:
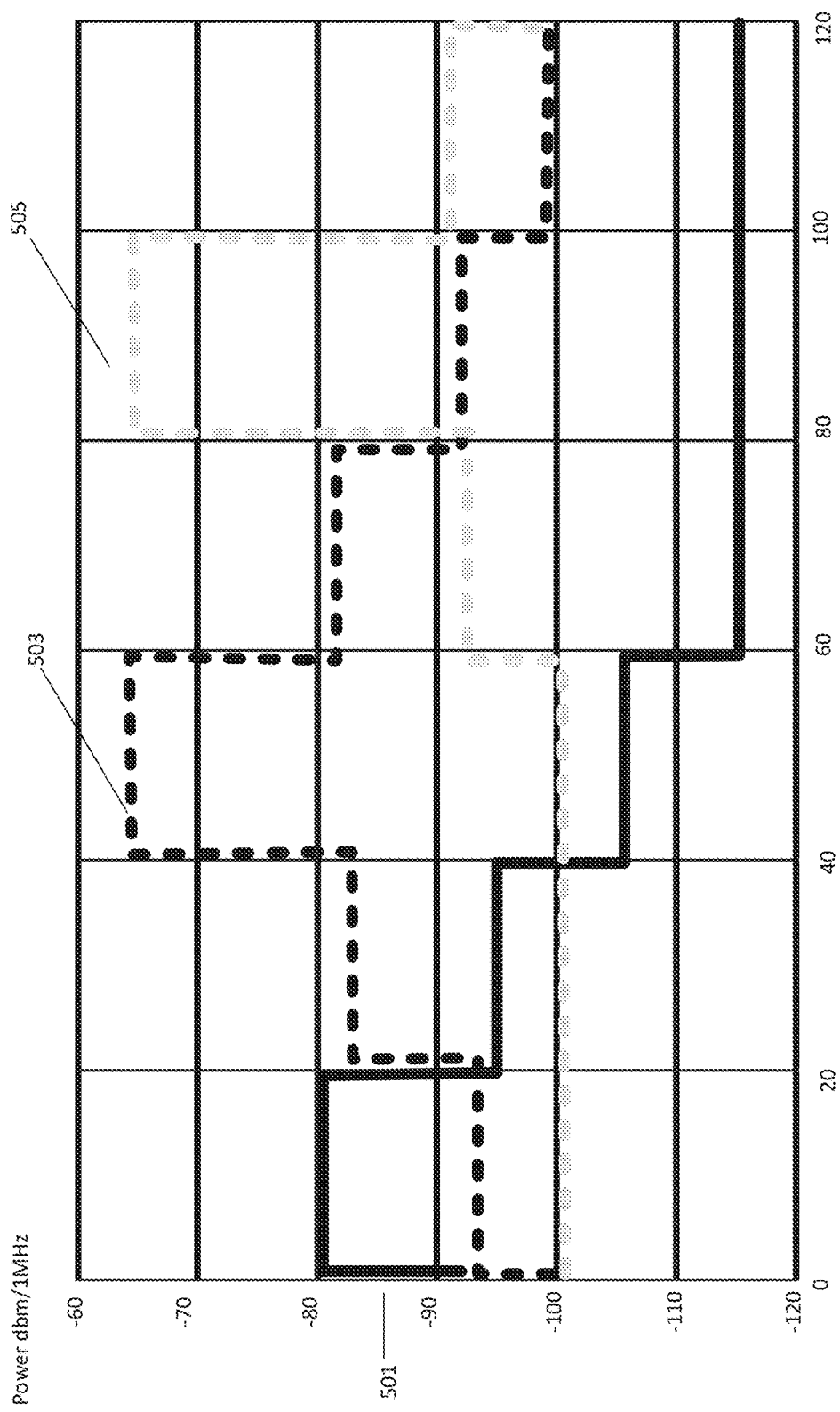
FIG. 6 shows a first instance of MU UL according to a Binary Resource Unit Separation Scheme.

FIG. 6 shows a first instance of optimization of MU UL according to an OFDMA separation scheme (hereinafter referred to as "Binary RU Separation Scheme"). As described herein, and according to one aspect of the disclosure, the STAs in an OFDMA MU UL scenario may be grouped to permit improved initial transmission for estimation of received power and decoding. As shown in this figure, STAs 501, 503, and 505 are assigned to a single UL MU group and asked to transmit UL information simultaneously for at least the estimation of received power. Each STA within the MU UL group is separated from another STA by at least one adjacent RU. By dividing STAs 501 through 506 into two subsets such that STA transmission is isolated (i.e. RUs adjacent to the assigned RU remain unused), and by instructing only one subset at a time to transmit, the noise is greatly reduced and signal-to-noise ratio improved. This occurs because the primary noise source for the STA is received from STAs assigned to adjacent RUs. As depicted in FIG. 5 each STA's transit mask is readily identifiable and is depicted with greater distance from noise than shown in FIG. 5. It is noted that where one subset transmits, the other subset must generally not transmit, so as to allow for minimal interference at the AP (i.e. the transmission is performed in two phases—subset one transmits during phase one, and subset two transmits during phase two. This separation of STAs into two subsets and assignment of non-adjacent RUs reduces noise from other stations, improves decoding, and allows for improved optimization of UL transmit power and transmit coding scheme.

Figure 7:
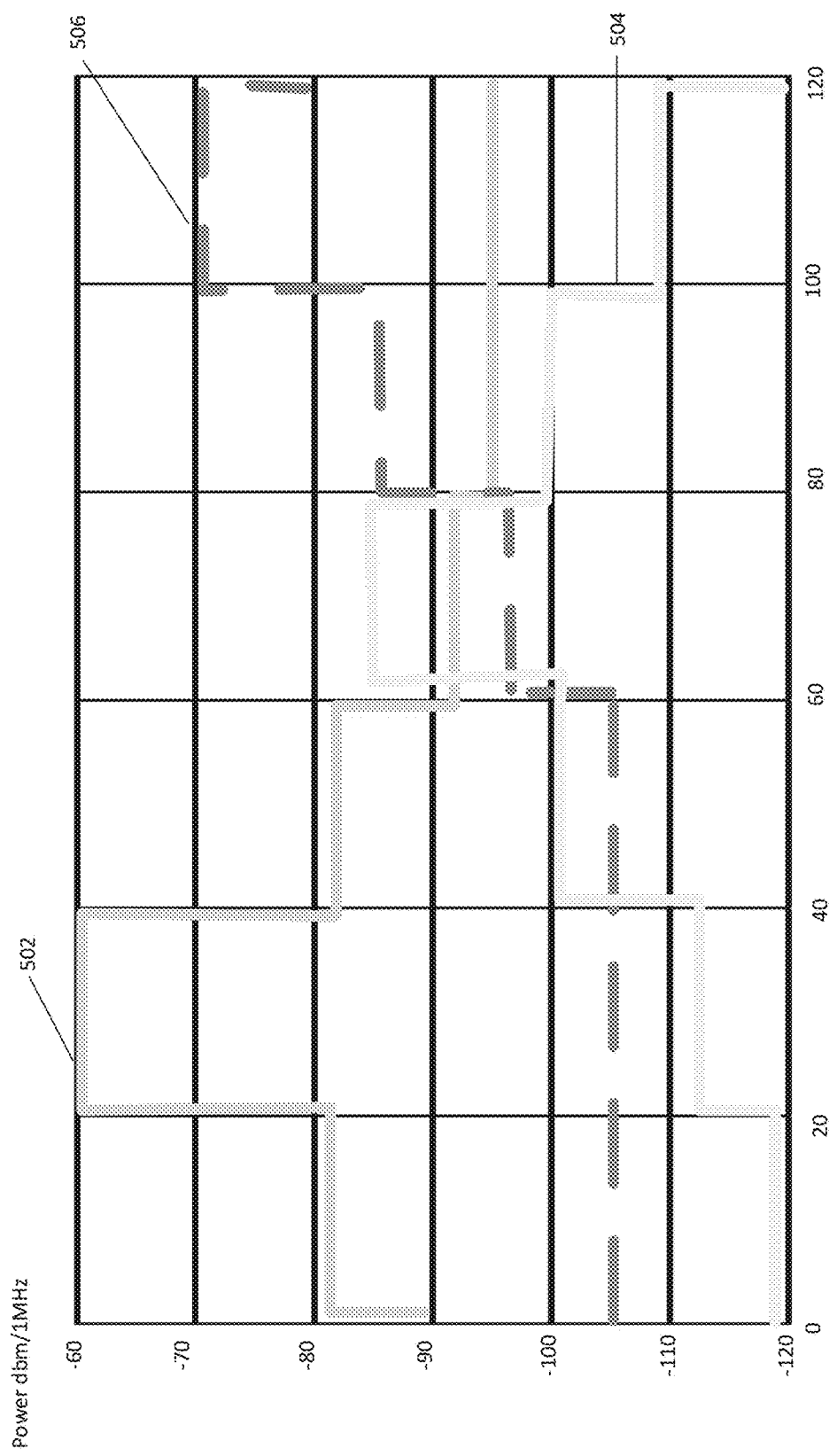
FIG. 7 shows a second instance of MU UL according to Binary Resource Unit Separation Scheme.

FIG. 7 shows a second instance of optimization of MU UL according to the Binary RU Separation Scheme. In this figure, the remaining STAs 502, 504, and 506 include a second subset, which is asked to transmit an initial transmission for estimation of received power and decoding following the transmission of the first subset. Each STA in the second subset is separated from all other STAs in the second subset by at least one OFDMA symbol. As depicted, by dividing the MU UL STAs into two subsets, and by spacing the STAs with at least one RU in between, the noise for each STA is reduced, and the signal-to-noise ratio is improved. The STAs 502, 504, and 506, as depicted in this figure, will be better able to transmit a clear signal with a higher likelihood of successful decoding. For clarity, FIG. 6 and FIG. 7 depict the STAs as being assigned to either even or odd RUs. Specifically, the STAs in FIG. 6 are depicted as transmitting on the odd RUs, and the STAs in FIG. 7 are depicted as transmitting on the even RUs. Although this is an acceptable configuration, it is not necessary that odd or even RUs are assigned to only one subset, as long as each STA's assigned RU is removed from an adjacent RU by at least one RU.

Figure 8:
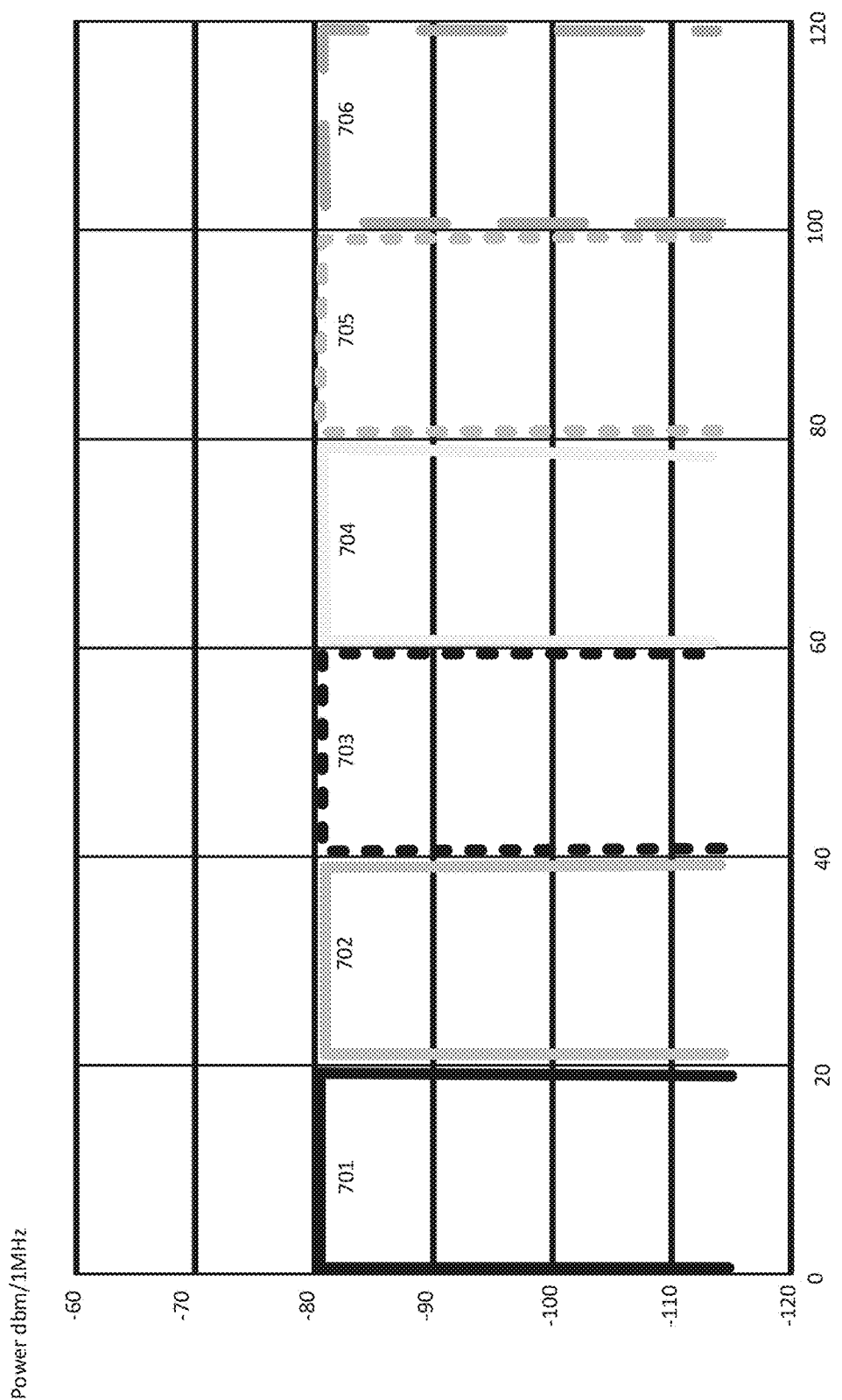
FIG. 8 shows an adjusted MU UL scheme following the Binary Resource Unit Separation Scheme.

FIG. 8 shows an adjusted MU UL scheme following the Binary RU Separation Scheme. After completion of the initial transmission as depicted in FIG. 6 and FIG. 7, the transmit power of each STA can be adjusted to form a more uniform basis and reduce unnecessary noise for other STAs. In this case, STAs 701 through 706 correspond to the previous STAs 501 through 506 following adaptation of transmit power, as calculated using the methods described herein. Using the transmit power as depicted in this figure, the signal-to-noise ratio is improved compared to the signal-to-noise ratio of the STAs within FIG. 5, and a higher likelihood exists of successful decoding within the AP.

Figure 9:
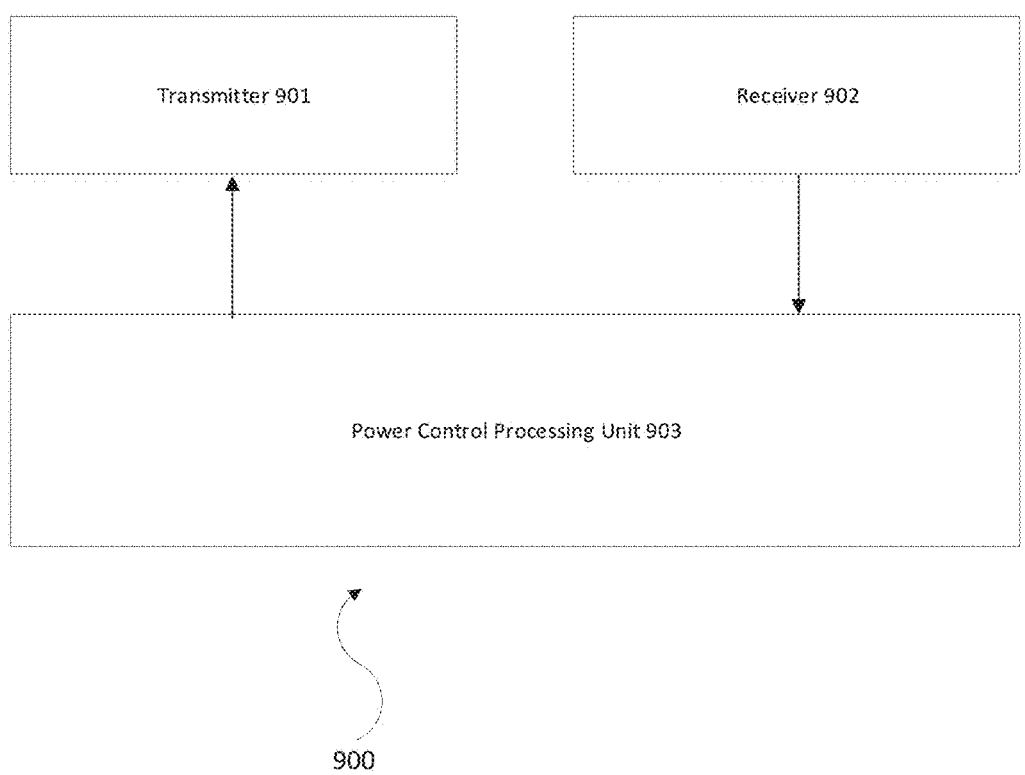
FIG. 9 shows a device for MU power control processing.

FIG. 9 shows a device for managing MU UL transmissions 900, including a transmitter 901, wherein the transmitter is configured to transmit a trigger frame with user-specific power and MCS parameters for the next UL packet; a receiver 902, configured to receive an UL MU packet, decode each user data, estimate each user received power, and decode from the data each user power headroom as reported by the STA; and a power control processing unit 903, configured to control the power control process and calculate an optimal power and MCS for each STA.

Figure 10:
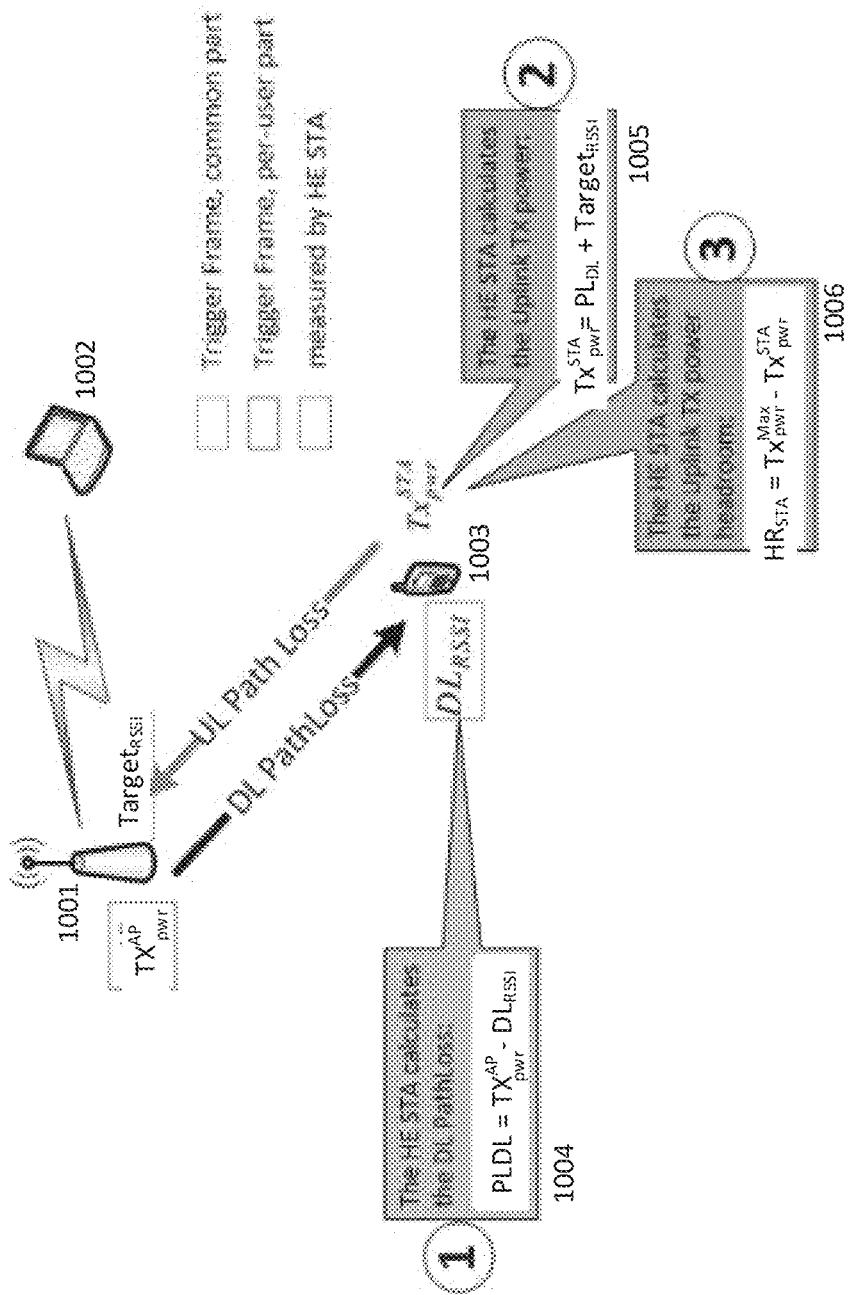
FIG. 10 shows a map for UL power control processing according to one aspect of the disclosure.

FIG. 10 shows a map for UL power control processing according to one aspect of the disclosure. In this diagram, the AP 1001 is shown as being connected to a computing unit such as a laptop or CPU 1002 and a mobile user device 1003. As depicted in this image, both the AP 1001 and the user device 1003 have a specific transmit powers for their signal transmission. With respect to the AP 1001, upon transmitting a downlink signal to the user device 1003 at the AP transmit power, the signal travels to the user device 1003 during which the signal incurs downlink path loss. Similarly, when the user device 1003 transmits an UL signal to the AP 1001 at the user device transmit power (shown as STA power), the UL signal travels to the AP 1001 during which time it incurs UL path loss. The following steps for calculating transmit power are described. In step one 1004, the STA calculates the downlink path loss from the signal traveling from the AP 1001 to the user device 1003, wherein the downlink path loss is equal to the AP transmit power minus the downlink Received Signal Strength Indication ("RSSI"). This is shown as follows:

$$PL_{DL} = TX_{pwr}^{AP} - DL_{RSSI} \quad (1)$$

Upon calculating the downlink path loss, the user device calculates the UL transmission power as shown in step two 1005. According to this step, the user device transmission power is equal to the download path loss plus the target RSSI, as follows:

$$TX_{pwr}^{STA} = PL_{DL} + \text{Target}_{RSSI} \quad (2)$$

Upon calculating the UL transmit power, the user device calculates the UL transit power headroom as shown in step three 1006, wherein the user device headroom is equal to the transmit maximum power minus the transmit STA power, as follows:

$$HR_{STA} = TX_{pwr}^{Max} - TX_{pwr}^{STA} \quad (3)$$

Figure 11:
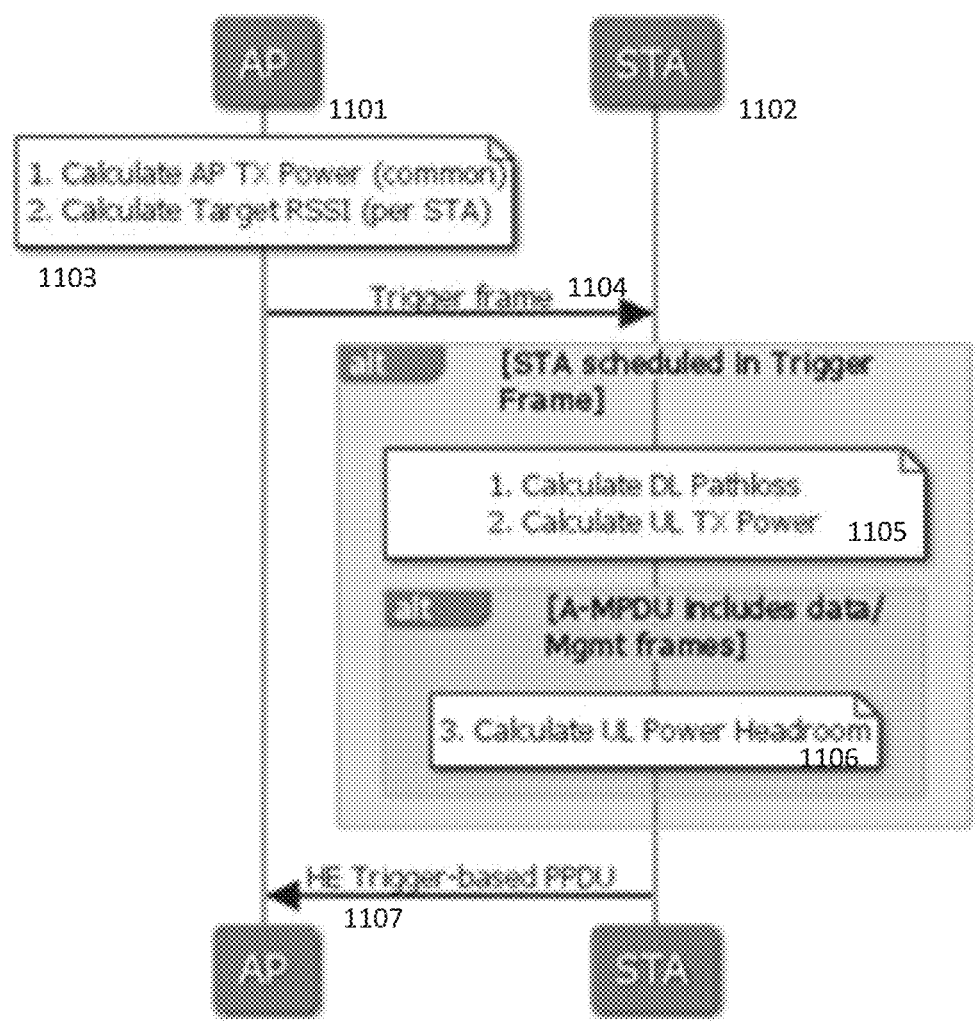
FIG. 11 shows a communication schematic for MU UL power management according to an aspect of the disclosure.

FIG. 11 shows a communication schematic for MU UL power management according to an aspect of the disclosure. This figure depicts communication between the AP 1101 and the user device (notated as a STA) 1102. According to the first step 1103, a common AP transmission power is calculated along with a target RSSI for each connected STA. The AP transmits a trigger frame 1104, which elicits a transmission from the connected STAs. According to one aspect of the disclosure 1105, the trigger frame contains a schedule for user device response to the trigger frame, and the user device calculates the downlink path loss and an UL transit power. According to an alternative aspect of the disclosure 1106, the A-MPDU includes at least one data/management frame, and the user device calculates an UL power headroom. Thereafter, the user device transmits a trigger based PPDU to the AP 1107.

Figure 12A:
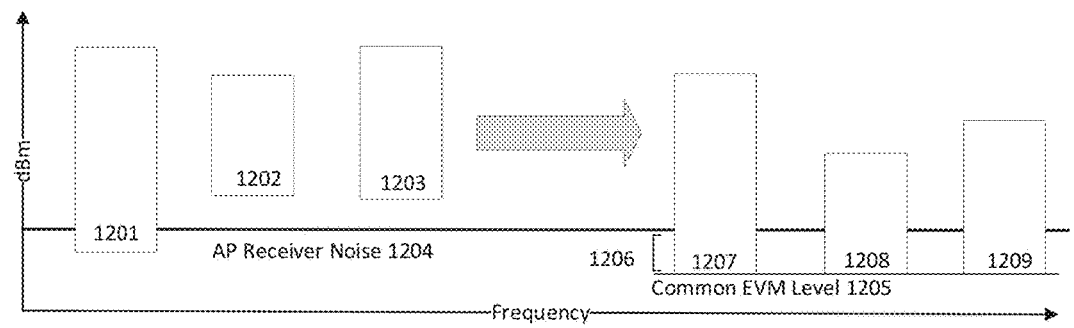
FIG. 12a shows MU UL power management, as achieved through formation of SNIR Noise Limited groups.

FIG. 12a shows a method of MU UL optimization, as achieved through formation of Signal to Interference Ratio ("SNIR") Plus Noise Limited UL MU Point Coordinator ("PC") service groups. According to this figure, STAs 1201, 1202, and 1203 are arranged into a Signal to Interference Plus Noise Ratio Limited Service Group (hereinafter referred to as "SNIR Limited Service Group"). According to one aspect of the disclosure, the SNIR Limited Service Group may include one or more STAs that are geographically removed from the AP such that the signals between the STAs in the AP experience significant path loss. STAs within the SNIR Limited Service Group usually transmit on a low MCS. They are generally limited by the AP receiver's noise floor 1204. As shown in FIG. 12a, the STAs' power levels are adjusted to create a common EVM noise floor that is lower than the AP noise floor. In this case, the common noise level is generated by the AP. According to one aspect of the disclosure, the transmit power for the STAs will be adjusted to a common EVM level 1205, wherein the common EVM level is beneath the AP receiver noise 1204. The difference between the common EVM level 1205 and the AP receiver noise 1204 is the target noise Delta. The target noise delta defines how the total interference noise increases the AP receiver noise. The target noise delta does not generally exceed 0.5 db, and it is most commonly within the range of 0.1 db to 0.2 db. 1206. In this figure, the maximum transmit power for STAs 1201, 1202, and 1203 has been adjusted such that the newly adjusted STAs are depicted as 1207, 1208, and 1209. The left side of FIGS. 12a, 12b, and 12c shows the standalone STA transmissions (SU transition); the right side shows the MU transmissions according to the UL parameter setting methodology.

Figure 12B:
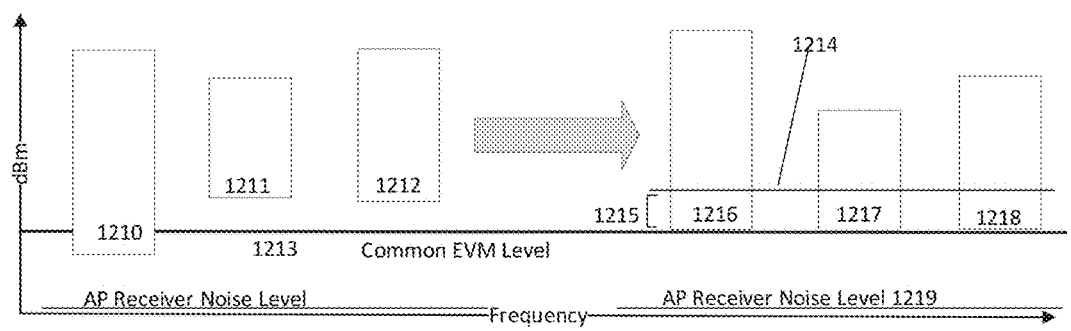
FIG. 12b shows MU UL power management, as achieved through formation of power amplifier Noise Limited groups.

FIG. 12b shows a method of MU UL optimization, as achieved through formation of an Access Point Transmission Noise Floor Limited Service Group (hereinafter "AP RX Noise Floor Limited Service Group"). STAs within the AP RX Noise Floor Limited Service Group are generally closer to the AP than the STAs in the SNIR Limited Service Group and transmit on a higher MCS since they are less limited by the AP receiver's noise floor. They may generally transmit at or near the maximum transmit power level that the AP can receive them. Some of the STAs may be limited by interference from other neighbors. They are limited by the EVM capability. In the AP RX Noise Floor Limited Service Group, the AP's noise floor is usually quite low compared to the limitations from internal noise. For this AP RX Noise Floor Limited Service Group, the common noise floor is set much higher than the AP noise floor. In this case, the common noise level to which the STAs are set is generated by the alternative users, and the power is set accordingly.

FIG. 12b shows three STAs 1210, 1211, and 1212, set as members of the AP RX Noise Floor Limited Service Group. A common EVM level is depicted as 1213. The STA's minimum transmission noise level 1214 is ascertained. The PA noise Delta 1215 is the difference between the common EVM level 1213 and the minimum transmission noise level. According to one aspect of the disclosure, the STAs in the AP RX Noise Floor Limited Service Group are assigned a modified UL transmit power such that the bottom range of the transmit power corresponds with the common EVM level 1213. Following the power control measures and MCS management measures as described herein, the STAs 1210, 12011, and 1212 are displayed as 1216, 1217, and 1218, respectively.

Figure 12C:
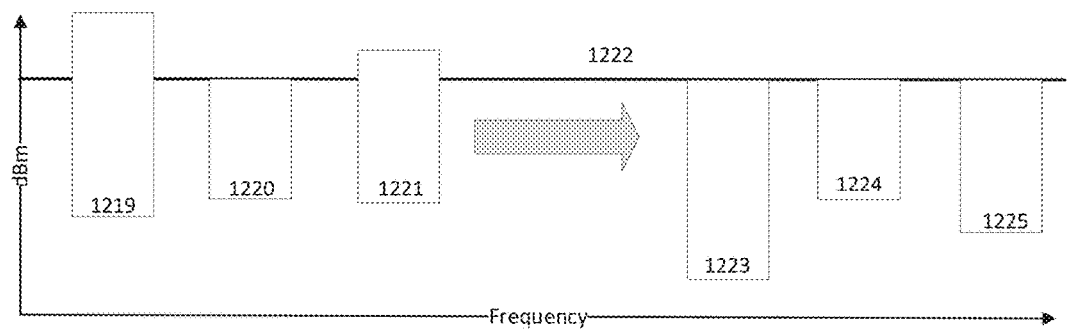
FIG. 12c shows MU UL power management, as achieved through formation of Minimal Received Signal Strength Indication limited groups.

FIG. 12c shows MU UL optimization, as achieved through formation of the AP Maximum Received Signal Strength Indicator Limited Service Group (hereinafter "AP Max RSSI Limited Service Group"). According to one aspect of the disclosure, the AP Max RSSI Limited Service Group is often very near to the AP. Because of the AP Max RSSI Limited Service Group's proximity to the AP, it may be important to reduce the UL transmit power to prevent the AP Max RSSI Limited Service Group's STAs from saturating the circuits of the AP. To achieve the same, a common RSSI level 1222 is used. The noise floor is not tuned, but rather the STAs are turned to the common RSSI level 1222. In this figure, STAs 1219, 1220, and 1221 are depicted as being both above and below the common RSSI level 1222. After receiving a modified UL transmit power, the STAs are depicted as 1223, 1224, and 1225, wherein the maximum range of the UL transmit power falls at the bottom edge of the common RSSI level 1222.

Figure 13:
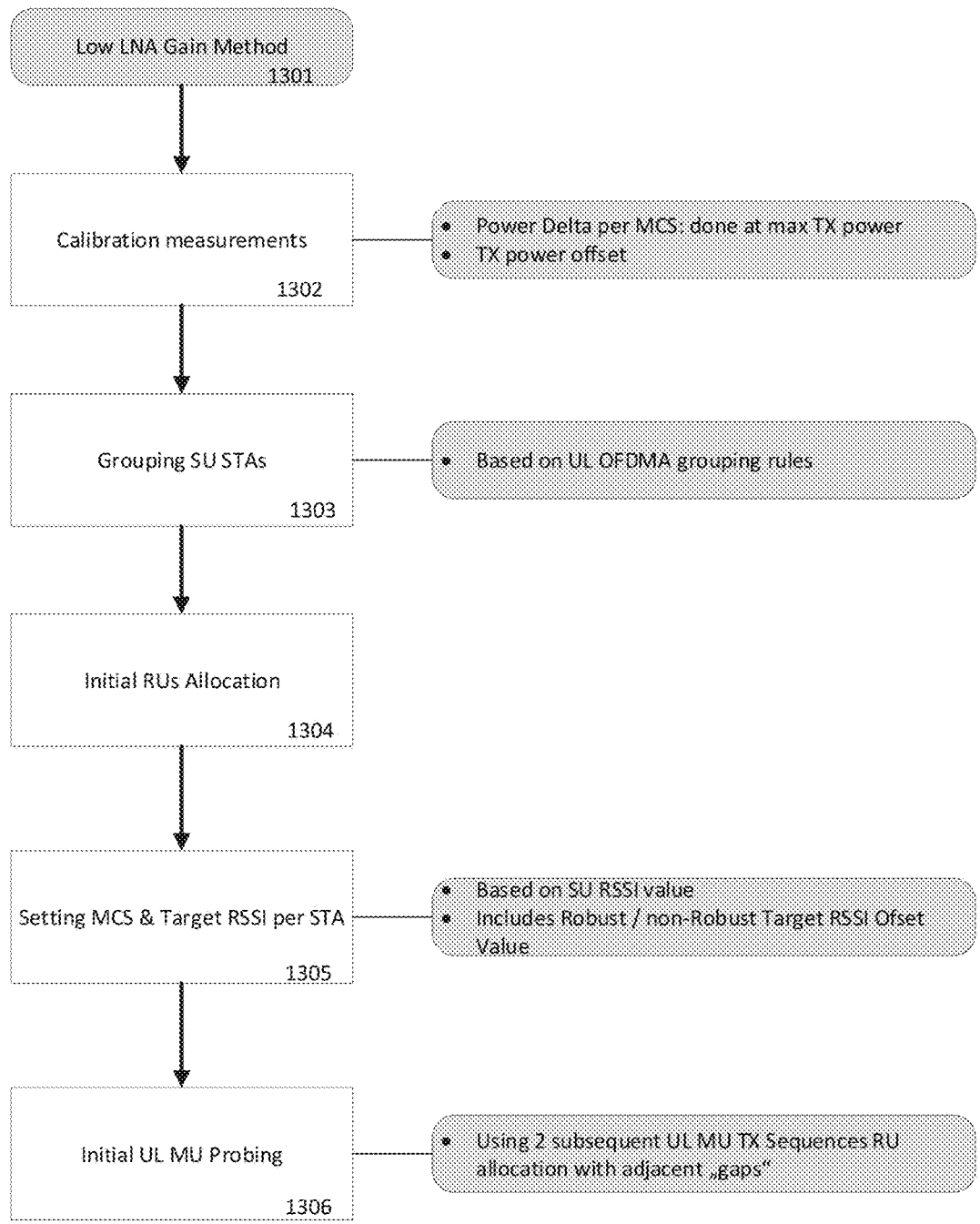
FIG. 13 shows a method for generating an UL transmission group and corresponding UL transmission group user parameters.

FIG. 13 shows a combined method for generating an UL MU PC service group and corresponding UL transmission UL MU PC service group user parameters. This figure depicts how a new UL MU PC service group is generated in the corresponding user parameters for the UL MU PC service group transmission are set. In this figure, the low LNA gain method 1301 is performed. Calibration measurements 1302 are then taken, in which the power Delta for each MCS is transmitted at maximum transmission power, and the transmission power offset for each STA is calculated. The STAs are then grouped 1303 according to UL OFDMA grouping rules. Each STA is then allocated with an initial RU for transmission 1304. The MCS and target RSSI is assigned to each STA 1305 based on an SU RSSI value including the robust/non-robust target RSSI offset value. An initial UL MU probing 1306 is then performed. Where this is achieved in an OFDMA context, the optimization is divided into two subsequent transmission sequences, wherein each sequence corresponds to approximately one half of the STAs, and wherein the transmissions are performed with adjacent RU gaps to limit interference.

Figure 14:
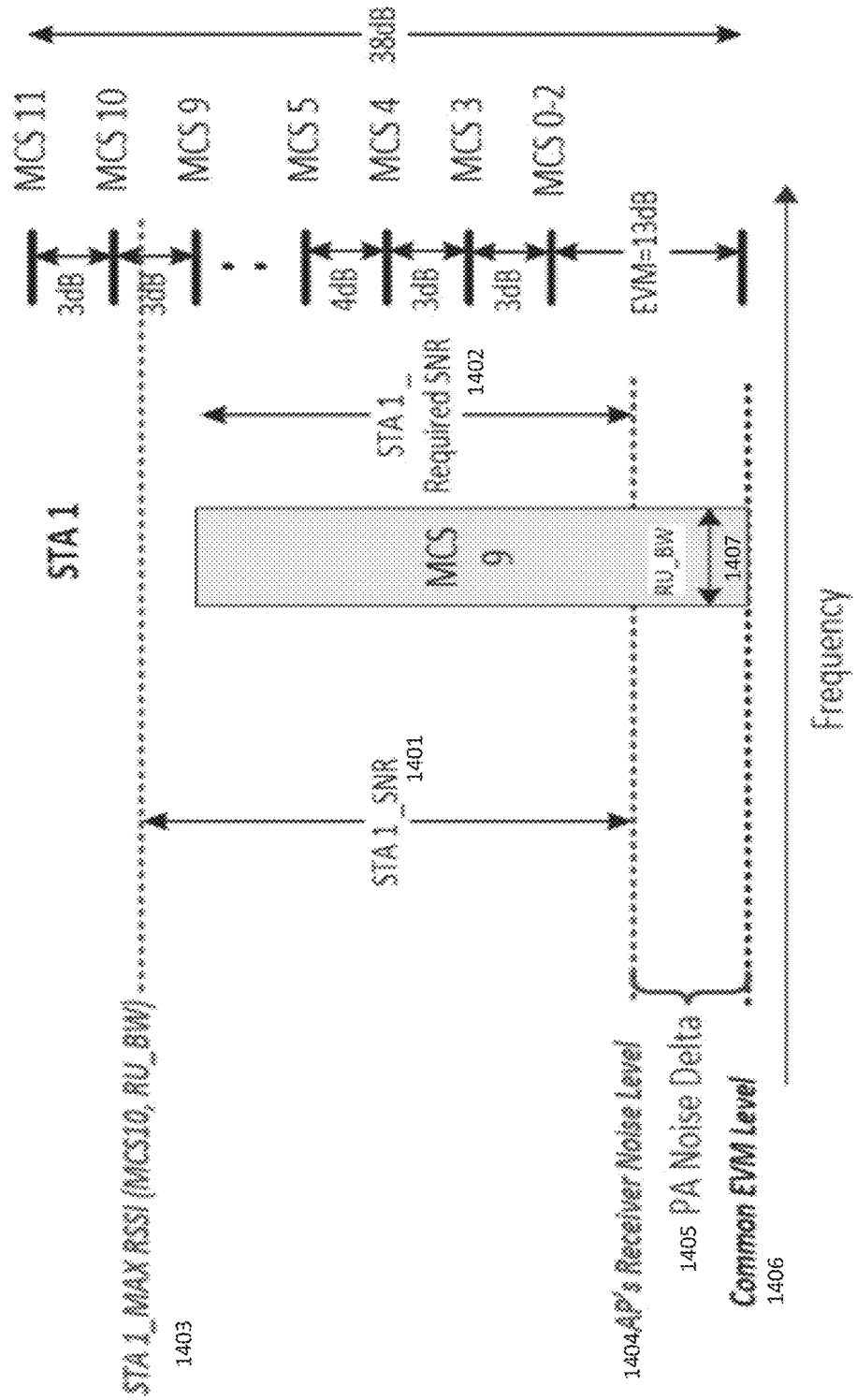
FIG. 14 shows a method for new group parameters user modulation and coding scheme calculation setting.

FIG. 14 shows a method for new group parameter user MCS calculation setting. According to the SNIR Limited Service Group method, the normalized maximum RSSI, receiver noise level, and STA maximum RSSI are set for each user in the UL transmission UL MU group. In this figure, the signal-to-noise ratio of STA one 1401 is ascertained, and a required signal-to-noise ratio 1402 is calculated. The AP receiver noise level 1404 and the common EVM level 1406 are determined, as well as the power amplifier noise Delta 1405, being the difference between the AP receiver noise level 1404 and the common EVM level 1406. The STA is assigned an UL transmit value 1407, the bottom range of which corresponds to the common EVM level 1406, and the top range of which is at or beneath the maximum RSSI 1403.

Figure 15:
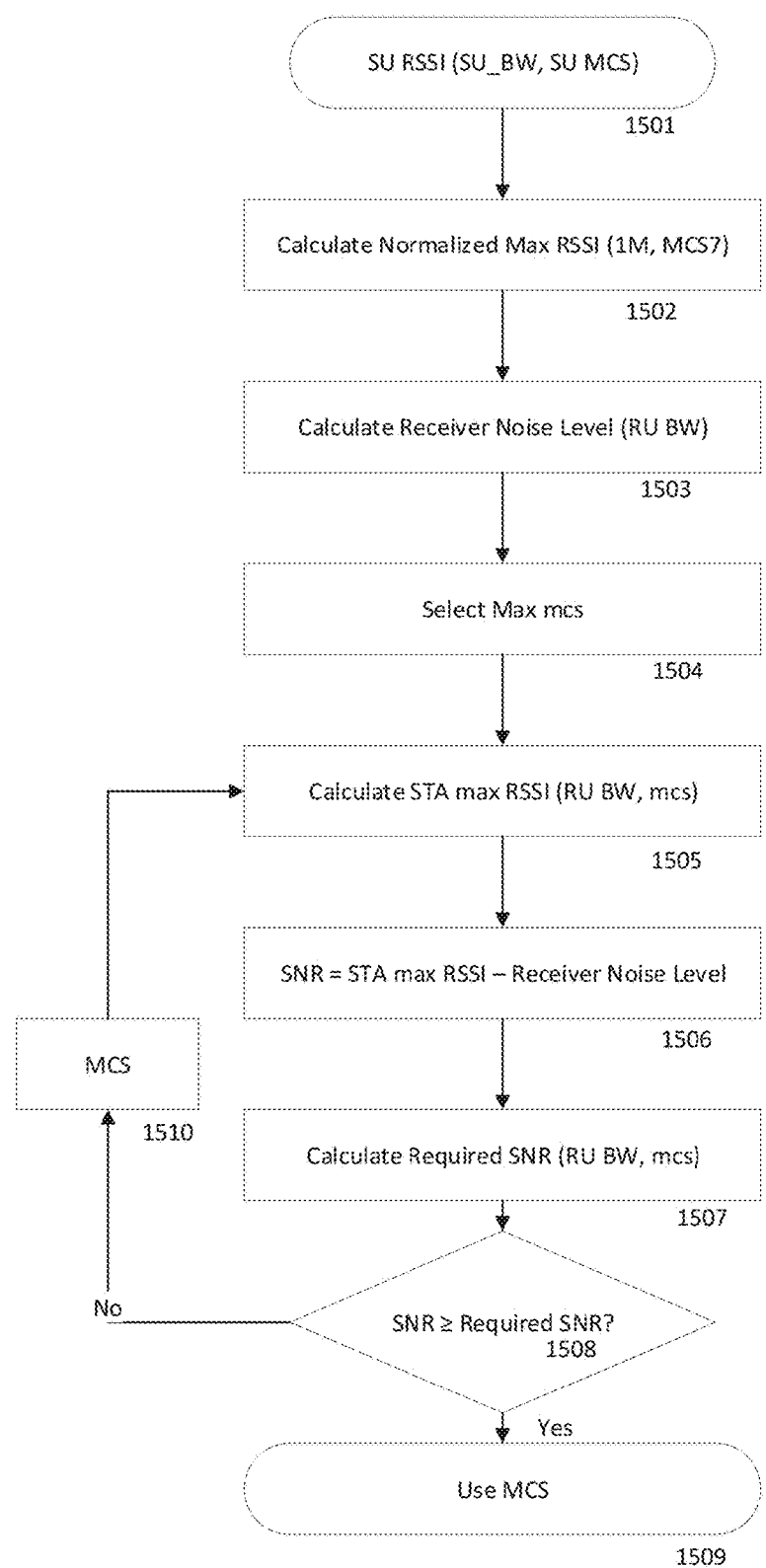
FIG. 15 shows a method for new group parameters setting.

FIG. 15 shows a method for setting new UL MU group parameters. According to this method, the SU RSSI 1501 is determined. A normalized maximum RSSI 1502 is then calculated. A receiver noise level 1503 is determined. The maximum MCS is selected 1504. A maximum STA RSSI is calculated 1505. The signal-to-noise ratio is then determined 1506, the signal-to-noise ratio being the STA maximum RSSI minus the receiver noise level. A required signal-to-noise ratio is then calculated 1507. It is then determined whether the signal-to-noise ratio is greater than or equal to the required signal-to-noise ratio 1508. If the signal-to-noise ratio is greater than or equal to the required signal-to-noise ratio, the current MCS is used 1509. If the signal-to-noise ratio is not greater than or equal to the required signal-to-noise ratio, then the MCS is changed 1510, and a new STA maximum RSSI is calculated based on the revised MCS 1505.

Figure 16:
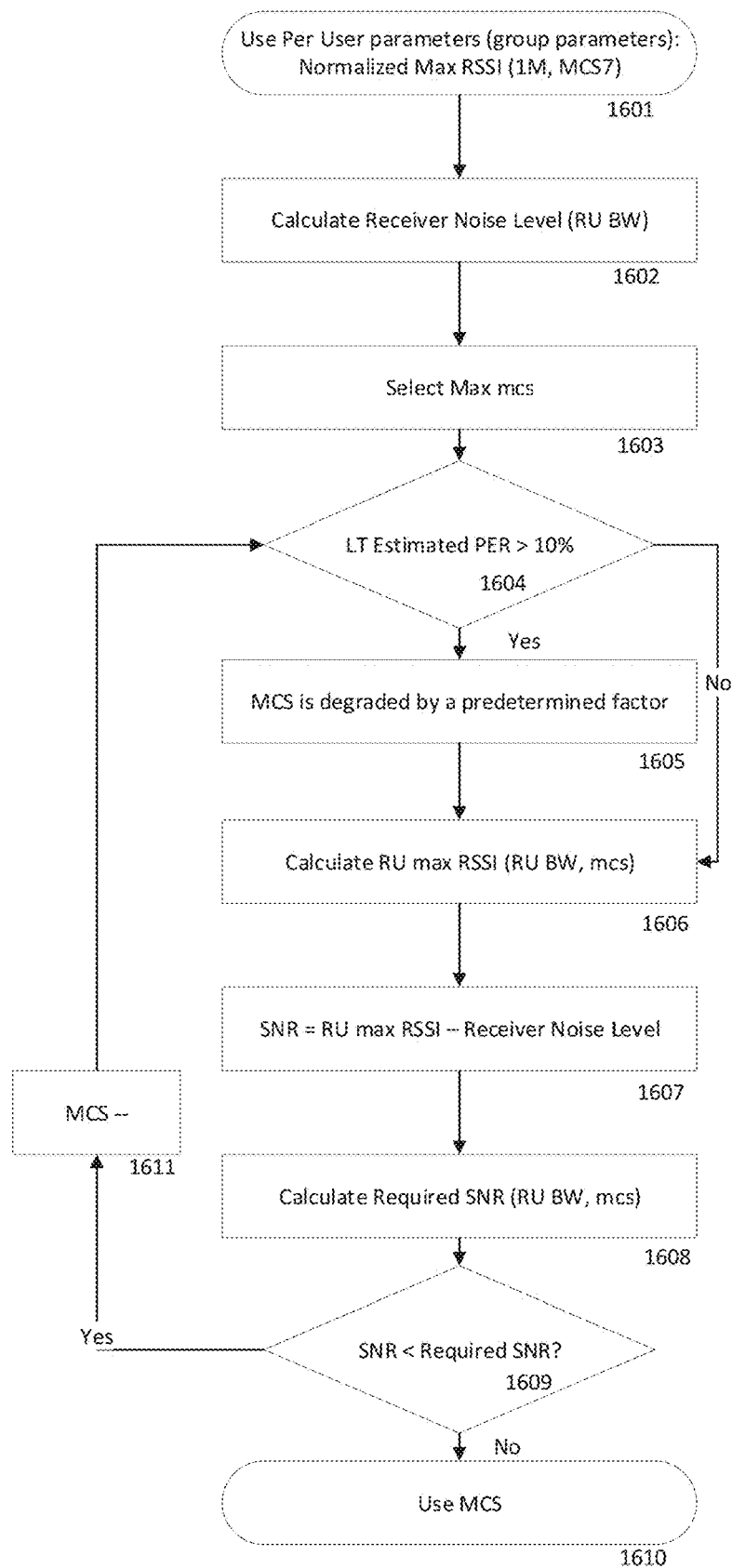
FIG. 16 shows a method for UL transmission group parameters update.

FIG. 16 shows a method for an UL MU transmit group parameter update. According to this method, parameters for each user are determined such as the normalized maximum RSSI 1601. The receiver noise level is calculated 1602. A maximum MCS is selected 1603. It is then ascertained whether a long term ("LT") estimated packet error rate ("PER") is greater than 10% 1604. Where the LT estimated PER is greater than 10%, the MCS is degraded by a factor 1605. According to one aspect of the disclosure, the factor may be three MCS index levels. The RU maximum RSSI is calculated 1606. The signal-to-noise ratio is determined as being the RU maximum RSSI minus the receiver noise level 1607. The required SNR is then calculated 1608. It is then determine whether the signal-to-noise ratio is less than the required signal-to-noise ratio 1609. Where the signal-to-noise ratio is not less than the required signal-to-noise ratio, the current MCS is used 1610. Where the signal-to-noise ratio is less than the required same to noise ratio, the MCS is reduced 1611, and it is again determine whether the LTE estimated PER is greater than 10% 1604.

Figure 17:
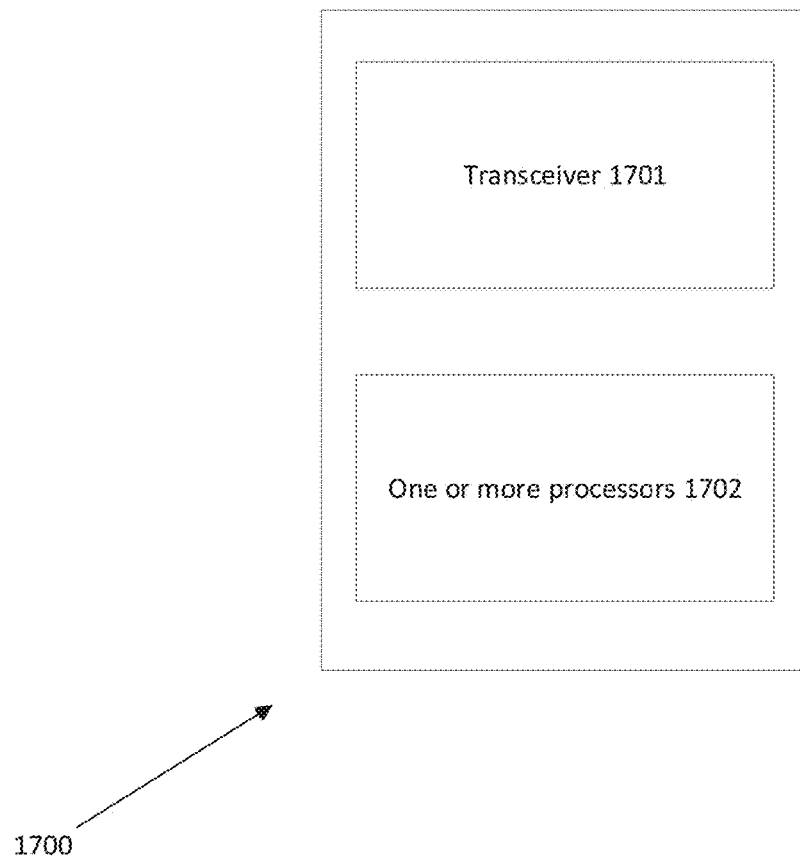
FIG. 17 shows an apparatus for MU UL optimization.

FIG. 17 shows an apparatus for multiuser uplink power control 1700 comprising a transceiver 1701, configured to receive an uplink transmission from a plurality of stations; and one or more processors 1702, configured to group the plurality of stations into a plurality of subsets based on a subset characteristic; receive a subset optimization transmission from a first subset according to a subset rule; and calculate a calibrated coding data rate and a calibrated target uplink transmit power for a station in the first subset based on the subset optimization transmission.

Figure 18:
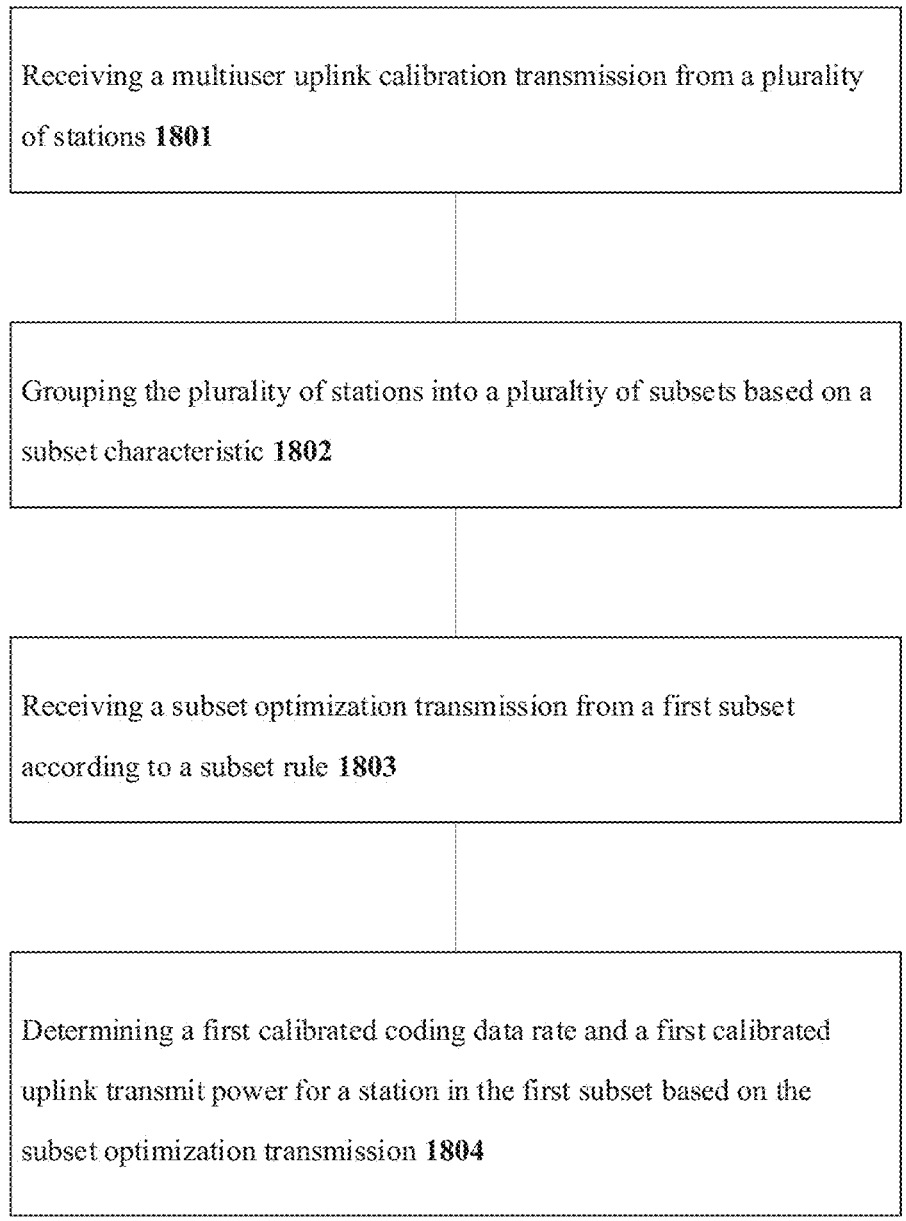
FIG. 18 shows a method for MU UL optimization.

FIG. 18 shows a method for MU UL power control including receiving a multiuser uplink calibration transmission from a plurality of stations 1801; grouping the plurality of stations into a plurality of subsets based on a subset characteristic 1802; receiving a subset optimization transmission from a first subset according to a subset rule 1803; and calculating a first calibrated coding data rate and a first calibrated target uplink transmit power for a station in the first subset based on the subset optimization transmission 1804.

It is anticipated that 802.11ax will include specifications for MU UL operation within a radio access technology. Although the 802.11ax standard is currently in its drafting phase, the August 2017 update of the 802.11ax draft standard expressly permits MU UL operation. In the August 2017 update, the MU UL is contained in at least Section 27.5.2 it is expressly anticipated that the 802.11ax standard may undergo one or more revisions before and after publication, and therefore nothing herein should be understood as a limitation to any specific addition of the 802.11ax standard, or to the 802.11ax standard itself. Rather, the methods and concepts disclosed herein are intended to apply to any wireless transmission system permitting MU UL, including, but not expressly limited to, any current or future editions of 802.11ax.

802.11ax supports UL MU transmissions, either as OFDMA or MU-MIMO. For UL MU transmissions to work, there must be an accurate STA transmit power control algorithm, which is managed by the AP. Herein are described methods for calibrating and optimizing the transmit power control loop to reach minimal interference between users and improve UL throughput.

Wireless transmission techniques from multiple STAs to the AP, such as MU MIMO and OFDMA, require controlling each STA transmit power. Proper power control permits minimization of interference between users; permits the radiofrequency receiver (mainly the low noise amplifier) to handle multiple user signals with different powers; and it enables the user of minimal power from the STAs to reduce power consumption. Herein is disclosed MU UL power control beginning with an initial calibration, followed by one or more optimization methods.

Initial Transmit Power Control Calibration

The power control procedure generally begins with online calibration for each STA, based on an UL power control target setting, after connecting to the AP. During the calibration phase, each STA is asked to transmit one or more UL PPDUs and to report based on the actual transmission additional information, such as PC headroom, from which the maximum power per modulation code scheme and the constant error in estimating the path loss and absolute transmit power offset are estimated by the AP. Based on this information and common MU UL transmission parameters, the AP can assign for each STA an RU, an UL transmit power, an MCS, and a target RSSI.

The following is a more detailed description of the calibration procedure as described herein. During the calibration procedure, and accordance with the standard protocol, 12 UL SU PPDU are triggered from one or more STAs separated by a high frequency, wherein each STA is asked to transmit its maximal power for each MCS ranging from 0 to 11. The received transmit powers for each MCS are saved. For each STA, the AP selects a specific MCS and instructs the STA to transmit using that MCS with a specific target received power (the same power measured at the maximal power packet). To achieve this, the STA must estimate the path loss from the trigger packet that includes the information of the AP transmit power, set its transmitter power accordingly, and report to the AP the headroom in its power (the Delta from the maximal power it can transmit).

From the received power of the packet and headroom report, the AP estimates the constant errors in the STA received power estimator and the absolute transmit power calibrations. This is saved as error data for each STA and later used to select a more optimized UL transmit power for the STA. Although some or all of this procedure may be used at other portions of normal operation, this is consistent with the calibration procedure as disclosed herein. The selection of transmit power and MCS during calibration, however, requires consideration of multiple variables and is unlikely to yield optimized power control parameters. Accordingly, it is also disclosed herein to perform a fine-tuning or optimization procedure following the initial calibration.

Transmit Power Control Optimization

In light of the need for additional optimization after an initial calibration, two methods are disclosed herein to further optimize the UL transmit power and/or MCS: the Binary RU Separation Scheme and the Service Group Method may be used individually or in combination. Where the Service Group Method is used, the Service Group Method can be implemented according to at least one of three Service Group Method configurations: SNIR Limited Service Group; AP RX Noise Floor Limited Service Group; and AP Max RSSI Limited Service Group.

The Binary RU Separation Scheme for Transmit Power Optimization

In a MU UL scenario, which is now permitted by 802.11ax, unregulated UL power may result in the combination of one or more UL signals blocking signals from the remaining STAs. To prevent this, one needs to calibrate and optimize the upload power. The goal of such calibration and subsequent optimization is to maintain STA connectivity and minimize the packet errors. Multiple simultaneous uncalibrated UL transmissions may be counterproductive, as they may create significant noise and corresponding error. Where multiple uncalibrated STAs simultaneously transmit, some of the STAs are likely to have inadequate signal strength compared to the remaining STAs, and their signals may not be able to be decoded by the AP. Accordingly, a two phase optimization scheme is disclosed, hereinafter described as the Binary RU Separation Scheme, wherein a first subset of the users are asked to transmit first, followed by a transmission from a second subset. The Binary RU Separation Scheme requires the STAs to have a mark of interference out of the operation RUs. Wherever the main transmission frequency is, it is anticipated that the transmission mask will result in an adjacent RU having 30 dB less noise, and the next adjacent RU will have 12 dB less noise than that. Thus, by reserving the adjacent RU and keeping it unused, the interference rejection is improved.

According to the Binary RU Separation Scheme for transmit power optimization, the STAs are separated into two subsets according to a binary subset characteristic. The STAs in the first subset are assigned a RU for the UL transfer, wherein each STA is assigned a RU that is separated from the RUs of all other STAs by at least one RU. That is, no two STAs within the first subset are assigned to adjacent RUs. Similarly, for the second subset, each STA is assigned a RU, wherein each assigned RU is separated from every other assigned RU by at least one RU. That is, no two STAs within the second subset are assigned to adjacent RUs. The first subset is asked to transmit a first PPDU, and the second subset is subsequently asked to transmit a second PPDU. The transmissions are performed according to a subset rule, which requires that only one subset transmit at a given time. That is, the second subset must not transmit, or must transmit at zero power, or a very low power, while the first subset transmits. Similarly, the first subset must not transmit, or must transmit at zero power, or a very low power, while the second subset transmits. The division of the various STAs in a MU context into two PPDU groups significantly improves immunity against interference at least because the number of transmitting STAs is reduced, thereby reducing the amount of interference from simultaneously transmitting STAs. Moreover, interference is reduced by separating the transmissions into nonadjacent RUs, which provides additional bandwidth between transmitting STAs for transmission mask resolution. This procedure permits better estimation of the receive signal power of each user and allows for a higher probability of decoding the packets without errors (less noise and higher signal-to-noise ratio).

According to one aspect of the disclosure, the member STAs for the UL MU optimization subsets can be changed. Upon assigning members of a UL MU subset, the AP can change the STAs that include the UL MU subset. In the event that the AP changes the STAs for a UL MU subset, however, the AP must reoptimize the STAs within the UL MU subset to ensure proper UL transmit power.

This two-phase method of optimization may perform several functions and offer several benefits. First, the separation of STAs into two subsets for two-phase optimization according to the binary resource separation scheme permits more favorable spacing of OFDMA assignment, such that STAs are assigned every other RU for transmission. This permits a blank RU between STAs during MU UL, which as described above, reduces the noise from simultaneously transmitting STAs and thereby improves AP reception and decoding. Because the UL transmissions include other related parameters for fine calibration, such as headroom, it is desirable to structure this transmission such that the transmission is received and decoded with increased accuracy, such that the AP can use the decoded information to select improved transmit parameters for each STA to better optimize the UL transmit parameters.

Service Group Methods for Uplink Power Optimization

Next is described a second method for UL transmit power optimization using UL MU power control service groups, referred to herein as the Service Group Method. The Service Group Method includes UL MU PC service group classification and UL PC monitoring/tracking parameters for maximizing UL throughput with accurate and stable parameter setting. That is, the stations are grouped into subsets according to a subset characteristic, wherein the subset characteristic is the one or more the factors described infra that correspond to a service group.

The UL MU PC service group classification algorithm disclosed herein includes UL MU user mapping, specific UL MU group generation, and UL MU group maintenance. With respect to the initial mapping into the UL MU PC service group, the UL MU PC service group user initial mapping includes rules for the UL MU user classification and UL MU group generation, which are based on the parameters of the STA as a "single user", that is, before being permitted to engage in MU UL transmission. The data obtained for grouping stations into service groups for subsequent optimization may at least partially obtained from the station calibration procedure described supra.

The UL MU PC service groups include the following basic UL MU PC service groups: (1) an SNIR Limited Service Group; (2) an AP RX Noise Limited Service Group; and (3) and an AP Max RSSI Limited Service Group.

In the SNIR Limited Service Group, all STAs are limited due to either the AP's initial receiver noise (which is LNA group dependent) or external interference noise. The common error vector magnitude ("EVM") for all STAs is generally beneath the SNIR noise reference. This UL MU PC service group tends to include STAs that are considerably far from the AP. Without proper upload transmit power management, the STAs may be blocked by other STAs closer to the AP. The STAs may be transmitting at or near the maximum transmit power.

In the AP RX Noise Floor Limited Service Group, which is a non-noise limited group, all STAs in the UL MU PC service group are limited due to minimal transmit noise.

AP Max RSSI Limited Service Group, the STAs may be limited due to UL transmission noise saturation. The STAs tend to be very close to the AP. They may have a high signal-to-noise ratio, but they tend to saturate the AP receiver, thereby disrupting transmission for STAs and other UL MU PC service groups.

Based at least on the UL MU PC service group mapping, an UL MU group is generated by selecting a set of users to be associated in either an SNIR Limited Service Group, an AP RX Noise Floor Limited Service Group, or an AP Max RSSI Limited Service Group. Once assigned to a service group, information is exchanged, and the UL PC parameters are updated based on the received results of each of the users within the service group.

The methods described herein provide low complexity strategies for UL MU PC service group classification and UL PC monitoring/tracking parameter setting for maximizing the UL throughput with accurate and stable parameter setting as needed for implementation.

The UL MU PC service group classification includes at least the following aspects. First, the UL MU group classification includes at least user initial mapping into UL MU PC service groups based on pre-defined STA parameters and UL PC monitoring/tracking parameters (RSSI, EVM, SNR, etc.), as well as classification of the user based on STA reception measurement accuracy, STA transmission power accuracy, channel variations per user (between consecutive PPDUs), LNA gain levels, etc. Second, the UL MU group generation by group user selection is based on UL MU PC service group specific parameters including pre-defined STA parameters, initial RU allocation, UL MU group noise reference classification, UL MU group parameters setting, UL MU MAC transmission, rate adaptations to UL MU group members limitation, etc. Third, the UL MU PC working point with a specific UL MU group is based on a set of repeated UL MU PC service group roles including: parameter setting for existing UL MU OFDMA groups, UL MU group noise reference classification, criteria for dismantling UL MU OFDMA groups, UL RU allocation selection, etc.

Regarding the classification of STAs into UL MU PC service groups, service groups may include users that are received in the AP under the same receiver's low noise amplifier gain range, enabling generation of a group's estimated common Error Vector Magnitude level (EVM) This common error vector magnitude level is always beneath the noise level at the AP's receiver with a positive power amplifier noise Delta. Each gain level generates a different noise figure.

Regarding the SNIR Limited Service Group, a noise reference is determined for each UL transmit group, according to the AP receiver's noise level, which is based on the noise figure of the relevant group, external interferer noise level, minimal transmit power amplifier noise level, etc.

According to the SNIR Limited Service Group method, a normalized maximum RSSI, a receiver noise level, and a STA maximum RSSI are determined for each user in UL MU groups. The UL MU group parameter update performs an update of the trigger frame construction parameter including the MCS selection for each user and a target RSSI for each user; an UL MU protocol data unit reception parameter update including a normalized maximum RSSI update for each user, an UL power control indication update, an estimated packet error rate update for each user, a long term maximum RSSI allowed DB update, and a long term estimated packet error rate DB update.

According to one aspect of the disclosure, the calibration procedure may be performed, followed by both a Binary RU Unit Separation Scheme Optimization and a Service Group Optimization. In a first phase (Calibration), the STAs serve as single user STAs, and the AP accumulates information based on the STA UL PPDU (untriggered). In a second phase (Binary RU Separation Scheme Optimization), the AP initiates an UL MU transmission, wherein the STAs transmit a trigger-based PPDU at specified RUs, at a specified MCS, and at a target RSSI. The RUs are specified to reflect every other RU—that is, each STA is assigned a RU for which the adjacent RUs are not assigned to a STA. During this transmission, the STA includes UL power control related information. This phase can be repeated several times for various STAs. It can also be repeated for the same STA, for different RUs, different MCSs, or otherwise. In the third phase (Service Group Optimization), the AP selects a MU UL group to transmit together, based on the group the AP tune the specific STA parameters. Thereafter, the optimization phase concludes and a normal MU transmission can occur.

Where the optimization phase includes both Binary RU Separation Scheme Optimization and Service Group Optimization, the Binary RU Separation Scheme Optimization and Service Group Optimization can be performed in any order.

According to another aspect of the disclosure, the Calibration may be followed by an Optimization Phase which includes only the Binary RU Separation Scheme Optimization or Service Group Optimization.

According to one aspect of the disclosure, the power control calibration functions essentially as an open/closed loop power method, wherein the AP publishes a method of setting the UL transmit power, and the STA closes the loop by monitoring the path loss and determines the transmit power to transmit based on the parameters set by the AP. The UL power must nevertheless be optimized.

According to one aspect of the disclosure, if the noise floor is overcorrected, and therefore the MSC is reduced dramatically, the throughput is likely to be substantially reduced. This results in reduced data transfer and impaired efficiency. Therefore, it is necessary to appropriately correct the noise floor with the expectation of maintaining an MSC within the upper acceptable range.

Moreover, it may be necessary to adjust the transmission power on the first try before higher level operations are begun. Once high level operations have commenced, there is a significant risk of reduced throughout based on non-optimized STA power levels.

MCS has been used here as a specific example of a coding data rate for a STA. Wherein additional or alternative coding data rate systems are used, it is expressly anticipated that the optimization methods disclosed herein may incorporate other coding data rate systems, and nothing in this application should be limited to the MCS specific coding data rate structure.

The following examples related to various aspects of the disclosure

In Example 1, a method of multiuser uplink power control is disclosed comprising: receiving a multiuser uplink calibration transmission from a plurality of stations; grouping the plurality of stations into a plurality of subsets based on a subset characteristic; receiving a subset optimization transmission from a first subset according to a subset rule; and calculating a first calibrated coding data rate and a first calibrated target uplink transmit power for a station in the first subset based on the subset optimization transmission.

In Example 2, the method of multiuser uplink power control of example 1 is disclosed, wherein the coding data rate is a Modulation and Coding Scheme ("MCS") and Number of Spatial Streams ("NSS") rate Index Level.

In Example 3, the method of multiuser uplink power control of examples 1 or 2 is disclosed, wherein the subset characteristic is a binary characteristic creating a first subset and a second subset, and wherein the subset rule requires that only stations in the first subset or the second subset may transmit at a given time.

In Example 4, the method of multiuser uplink power control of example 3 is disclosed, further comprising assigning an uplink transmission unit to each of the plurality of stations within the first subset, wherein each assigned uplink resource unit ("RU"), is separated from all other assigned uplink resource units by at least one resource unit.

In Example 5, the method of multiuser uplink power control of examples 3 or 4 is disclosed, wherein the first subset and the second subset transmit sequentially.

In Example 6, the method of multiuser uplink power control of any one of examples 3 to 5 is disclosed, wherein the plurality of stations in the first subset are assigned even resource units, and the plurality of stations in the second subset are assigned odd resource units.

In Example 7, the method of multiuser uplink power control of any one of examples 3 to 6 is disclosed, further comprising estimating a received signal power and a Packet Error Rate ("PER") at a specific resource units allocation for one of the plurality of stations in the first subset based on the received subset uplink transmission.

In Example 8, the method of multiuser uplink power control of examples 1 or 2 is disclosed, wherein the subset characteristic is a membership criteria in a signal to interference plus noise ratio limited service group, an access point transmission noise floor limited service group, or a access point maximum received signal strength indicator limited service group, and wherein the subset rule is that only one service group may transmit at a given time.

In Example 9, the method of multiuser uplink power control of examples 1 or 2 is disclosed, wherein the subset characteristic is a membership criteria in a signal to interference plus noise ratio service group, a power amplifier noise limited service group, or a received signal strength indicator noise service group, and wherein the subset rule is that each station in a single service group must transmit at a given time.

In Example 10, the method of multiuser uplink power control of examples 1 or 2 is disclosed, wherein the subset characteristic is a membership criteria in a signal to interference plus noise ratio service group, a power amplifier noise limited service group, or a received signal strength indicator noise service group, and wherein the subset rule is that each station in a service group is assigned a specific uplink transmit resource unit.

In Example 11, the method of multiuser uplink power control of any one of examples 8 to 10 is disclosed, wherein a group accumulated common error vector magnitude level is less than a noise level at reception.

In Example 12, the method of multiuser uplink power control of any one of examples 8 to 11 is disclosed, wherein a group accumulated common error vector magnitude level has a positive power amplifier noise delta.

In Example 13, the method of multiuser uplink power control of any one of examples 8 to 12 is disclosed, wherein a service group is a signal to interference plus noise ratio limited service group ("SNIR Limited Service Group").

In Example 14, the method of multiuser uplink power control of example 13 is disclosed, further comprising estimating a group accumulated common mutual noise level according to an uplink transmission of one or more stations in the SNIR Limited Service Group, wherein the group accumulated common mutual noise level is estimated based on a normalized maximum received signal strength indicator, a receiver noise level, and a station maximum received signal strength indicator.

In Example 15, the method of examples 13 or 14 is disclosed, further comprising assigning an optimized coding data rate and an optimized target uplink transmit power to a station in the service group according to the group accumulated common mutual noise level.

In Example 16, the method of examples 14 or 15 is disclosed, wherein the group accumulated common mutual noise level is determined based on estimation of a common accumulated error vector magnitude among the plurality of stations in the first subset, and wherein the common accumulated error vector magnitude is separated from the receiver noise level of the access point by a target noise delta.

In Example 17, the method of multiuser uplink power control of any one of examples 8 through 12 is disclosed, wherein a service group is an Access Point Reception Noise Floor Limited Service Group ("AP RX Noise Floor Limited Service Group"), and wherein a station in the AP RX Noise Floor Limited Service Group is principally limited by one or more other stations in the AP RX Noise Floor Limited Service Group.

In Example 18, the method of multiuser uplink power control of example 17 is disclosed, further comprising determining a Access Point's reception noise floor delta as a difference between a common accumulated error vector magnitude and a minimal reception noise floor level, and assigning a station in the AP RX Noise Floor Limited Service Group an optimized target uplink transmit power that corresponds with an accumulated common error vector magnitude of the AP RX Noise Floor Limited Service Group.

In Example 19, the method of multiuser uplink power control of example 17 or 18 is disclosed, further comprising assigning a station in the AP RX Noise Floor Limited Service Group an optimized coding data rate according to at least a reception noise floor delta of the access point.

In Example 20, the method of any one of examples 17 through 19 is disclosed, wherein a group accumulated common mutual noise level is determined based on a common accumulated error vector magnitude among the plurality of stations in the first subset, and wherein the common accumulated error vector magnitude is separated from a minimum station transmit noise level by a reception noise floor delta of an access point.

In Example 21, the method of multiuser uplink power control of any one of examples 8 through 12 is disclosed, wherein a service group is an Access Point Maximum Received Signal Strength Indicator Limited Service Group ("AP Max RSSI Limited Service Group").

In Example 22, the method of multiuser uplink power control of example 21 is disclosed, further comprising estimating a common received signal strength indicator limitation of the plurality of stations of the service group, and assigning a station an optimized target uplink transmit power, wherein an aggregate of an estimated optimized accumulated uplink target transmit power corresponds to an accumulated common received signal strength indicator limitation.

In Example 23, the method of multiuser uplink power control of examples 21 or 22 is disclosed, further comprising assigning a station in the AP Max RSSI Limited Service Group with an optimized coding data rate according to a target common accumulated received signal strength indicator.

In Example 24, the method of example 22 or 23 is disclosed, wherein the optimized target uplink transmit power or optimized coding data rate are determined based on a common error vector magnitude among the plurality of stations in the first subset, and wherein the common error vector magnitude corresponds to the maximum uplink transmit power of a station in the first subset.

In Example 25, the method of multiuser uplink power control of any one of examples 8 through 24 is disclosed, further comprising comparing a signal to noise ratio for a station with a required signal to noise ratio, and wherein the signal to noise ratio is lower than the required signal to noise ratio, reducing the coding data rate by a predetermined factor.

In Example 26, the method of multiuser uplink power control of example 25 is disclosed, wherein the coding data rate is a NSS and Modulation and Coding Scheme, and wherein the factor by which the Modulation and Coding Scheme index is reduced is three.

In Example 27, the method of multiuser uplink power control of any one of examples 8 through 24 is disclosed, further comprising estimating a target long term packet error rate for a station, and where the estimated target long term packet error rate is lower than a predetermined packet error rate threshold, reducing the STA coding data rate by a predetermined factor.

In Example 28, the method of multiuser uplink power control of example 27 is disclosed, wherein the predetermined packet error rate threshold is ten percent; the coding data rate is a Modulation and Coding Scheme plus a Number of Spatial Streams ("NSS"); and the factor is three Modulation and coding scheme and NSS indexes.

In Example 29, the method of multiuser uplink power control of any one of examples 8 through 28 is disclosed, wherein the subset characteristic is derived from the multiuser uplink calibration transmission.

In Example 30, the method of multiuser uplink power control of any one of examples 1 to 29 is disclosed, wherein the subset characteristic comprises a limitation based on access point noise.

In Example 31, the method of multiuser uplink power control of any one of examples 1 to 29 is disclosed, wherein the subset characteristic comprises a limitation based on an access point maximum reception level.

In Example 32, the method of multiuser uplink power control of any one of examples 1 to 29 is disclosed, wherein the subset characteristic is an absence of a noise limitation.

In Example 33, the method of multiuser uplink power control of any one of examples 1 to 32 is disclosed, wherein the coding data rate comprises a Modulation and Coding Scheme.

In Example 34, the method of multiuser uplink power control of any of examples 1 to 33 is disclosed, further comprising estimating a received signal power and a packet error rate for one of the plurality of stations in the first subset based on the received subset uplink transmission.

In Example 35, the method of multiuser uplink power control of any one of examples 1 to 33 is disclosed, further comprising estimating a received signal power and a packet error rate for one of the plurality of stations in the first subset based on the received subset uplink transmission.

In Example 36, the method of multiuser uplink power control of example 27 is disclosed, wherein the predetermined packet error rate threshold is ten percent; the coding data rate is a Modulation and Coding Scheme; and the factor is three Modulation and coding scheme indexes.

In Example 37, an apparatus for multiuser uplink power control is disclosed comprising:
A transceiver, configured to receive a multiuser uplink calibration transmission from a plurality of stations; and one or more processors, configured to group the plurality of stations into a plurality of subsets based on a subset characteristic; receive a subset optimization transmission from a first subset according to a subset rule; and determine a first calibrated coding data rate and a first calibrated target uplink transmit power for a station in the first subset based on the subset optimization transmission.

In Example 38, the apparatus for multiuser uplink power control of example 37 is disclosed, wherein the coding data rate is a Modulation and Coding Scheme ("MCS") and Number of Spatial Streams ("NSS") rate Index Level.

In Example 39, the apparatus for multiuser uplink power control of examples 37 or 38 is disclosed, wherein the subset characteristic is a binary characteristic creating a first subset and a second subset, and wherein the subset rule requires that only stations in the first subset or the second subset may transmit at a given time.

In Example 40, the apparatus for multiuser uplink power control of example 39 is disclosed, further comprising being configured to assign an uplink transmission unit to each of the plurality of stations within the first subset, wherein each assigned uplink transmission unit is separated from all other assigned uplink resource units by at least one resource unit.

In Example 41, the apparatus for multiuser uplink power control of examples 39 or 40 is disclosed, wherein the first subset and the second subset transmit sequentially.

In Example 42, the apparatus for multiuser uplink power control of any one of examples 39 to 41 is disclosed, wherein the one or more processors are further configured to assign the plurality of stations in the first subset to even resource units, and to assign the plurality of stations in the second subset to odd resource units.

In Example 43, the apparatus for multiuser uplink power control of any one of examples 39 to 42 is disclosed, wherein the one or more processors are further configured to estimate a received signal power and a packet error rate at a specific resource unit allocation for one of the plurality of stations in the first subset based on the received subset uplink transmission.

In Example 44, the apparatus for multiuser uplink power control of examples 37 or 38 is disclosed, wherein the subset characteristic is a membership criteria in a signal to interference plus noise ratio limited service group, an access point transmission noise floor limited service group, or a access point maximum received signal strength indicator limited service group, and wherein the subset rule is that only one service group may transmit at a given time.

In Example 45, the apparatus for multiuser uplink power control of examples 37 or 38 is disclosed, wherein the subset characteristic is a membership criteria in a signal to interference plus noise ratio service group, a power amplifier noise limited service group, or a received signal strength indicator noise service group, and wherein the subset rule is that each station in a single service group must transmit at a given time.

In Example 46, the apparatus for multiuser uplink power control of examples 37 or 38 is disclosed, wherein the subset characteristic is a membership criteria in a signal to interference plus noise ratio service group, a power amplifier noise limited service group, or a received signal strength indicator noise service group, and wherein the subset rule is that each station in a service group is assigned a specific uplink transmit resource unit.

In Example 47, the apparatus for multiuser uplink power control of any one of examples 44 to 46 is disclosed, wherein a group accumulated common error vector magnitude level is less than a noise level at reception.

In Example 48, the apparatus for multiuser uplink power control of any one of examples 44 to 47 is disclosed, wherein a group accumulated common error vector magnitude level has a positive power amplifier noise delta.

In Example 49, the apparatus for multiuser uplink power control of any one of examples 44 to 48 is disclosed, wherein a service group is a signal to interference plus noise ratio limited service group ("SNIR Limited Service Group").

In Example 50, the apparatus for multiuser uplink power control of example 49 is disclosed, wherein the one or more processors are further configured to estimate a group accumulated common mutual noise level according to an uplink transmission of one or more stations in the SNIR Limited Service Group, wherein the group accumulated common mutual noise level is estimated based on a normalized maximum received signal strength indicator, a receiver noise level, and a station maximum received signal strength indicator.

In Example 51, the apparatus of examples 49 or 50 is disclosed, wherein the one or more processors are further configured to assign an optimized coding data rate and an optimized target uplink transmit power to a station in the service group according to the group accumulated common mutual noise level.

In Example 52, the apparatus of examples 50 or 51 is disclosed, wherein the one or more processors are further configured to determine the group accumulated common mutual noise level based on estimation of a common accumulated error vector magnitude among the plurality of stations in the first subset, and wherein the common accumulated error vector magnitude is separated from the receiver noise level of the access point by a target noise delta.

In Example 53, the apparatus for multiuser uplink power control of any one of examples 44 through 48 is disclosed, wherein a service group is an Access Point Reception Noise Floor Limited Service Group ("AP RX Noise Floor Limited Service Group"), and wherein a station in the AP RX Noise Floor Limited Service Group is principally limited by one or more other stations in the AP RX Noise Floor Limited Service Group.

In Example 54, the apparatus for multiuser uplink power control of example 53 is disclosed, wherein the one or more processors are further configured to determine an Access Point's reception noise floor delta as a difference between a common accumulated error vector magnitude and a minimal reception noise floor level, and to assign a station in the AP RX Noise Floor Limited Service Group an optimized target uplink transmit power that corresponds with an accumulated common error vector magnitude of the AP RX Noise Floor Limited Service Group.

In Example 55, the apparatus for multiuser uplink power control of example 53 or 54 is disclosed, wherein the one or more processors are further configured to assign a station in the AP RX Noise Floor Limited Service Group an optimized coding data rate according to at least a reception noise floor delta of the access point.

In Example 56, the apparatus of any one of examples 53 through 55 is disclosed, wherein the one or more processors are further configured to determine a group accumulated common mutual noise level based on a common accumulated error vector magnitude among the plurality of stations in the first subset, and wherein the common accumulated error vector magnitude is separated from a minimum station transmit noise level by a reception noise floor delta of an access point.

In Example 57, the apparatus for multiuser uplink power control of any one of examples 44 through 48 is disclosed, wherein a service group is an Access Point Maximum Received Signal Strength Indicator Limited Service Group ("AP Max RSSI Limited Service Group").

In Example 58, the apparatus for multiuser uplink power control of example 57 is disclosed, wherein the one or more processors are further configured to estimate a common received signal strength indicator limitation of the plurality of stations of the service group, and to assign a station an optimized target uplink transmit power, wherein an aggregate of an estimated optimized accumulated uplink target transmit power corresponds to an accumulated common received signal strength indicator limitation.

In Example 59, the apparatus for multiuser uplink power control of examples 57 or 58 is disclosed, wherein the one or more processors are further configured to assign a station in the AP Max RSSI Limited Service Group with an optimized coding data rate according to a target common accumulated received signal strength indicator.

In Example 60, the apparatus of example 58 or 59 is disclosed, wherein the one or more processors are further configured to determine the optimized target uplink transmit power or optimized coding data rate based on a common error vector magnitude among the plurality of stations in the first subset, and wherein the common error vector magnitude corresponds to the maximum uplink transmit power of a station in the first subset.

In Example 61, the apparatus for multiuser uplink power control of any one of examples 44 through 60 is disclosed, wherein the one or more processors are further configured to compare a signal to noise ratio for a station with a required signal to noise ratio, and wherein the signal to noise ratio is lower than the required signal to noise ratio, to reduce the coding data rate by a predetermined factor.

In Example 62, the apparatus for multiuser uplink power control of example 61 is disclosed, wherein the coding data rate is a NSS and Modulation and Coding Scheme, and wherein the factor by which the Modulation and Coding Scheme index is reduced is three.

In Example 63, the apparatus for multiuser uplink power control of any one of examples 44 through 60 is disclosed, wherein the one or more processors are further configured to estimate a target long term packet error rate for a station, and where the estimated target long term packet error rate is lower than a predetermined packet error rate threshold, reducing the STA coding data rate by a predetermined factor.

In Example 64, the apparatus for multiuser uplink power control of example 63 is disclosed, wherein the predetermined packet error rate threshold is ten percent; the coding data rate is a Modulation and Coding Scheme plus a Number of Spatial Streams ("NSS"); and the factor is three Modulation and coding scheme and NSS indexes.

In Example 65, the apparatus for multiuser uplink power control of any one of examples 44 through 64 is disclosed, wherein the one or more processors are further configured to determine the subset characteristic from the multiuser uplink calibration transmission.

In Example 66, the apparatus for multiuser uplink power control of any one of examples 37 to 65 is disclosed, wherein the subset characteristic comprises a limitation based on access point noise.

In Example 67, the apparatus for multiuser uplink power control of any one of examples 37 to 65 is disclosed, wherein the subset characteristic comprises a limitation based on an access point maximum reception level.

In Example 68, the apparatus for multiuser uplink power control of any one of examples 37 to 65 is disclosed, wherein the subset characteristic is an absence of a noise limitation.

In Example 69, the apparatus for multiuser uplink power control of any one of examples 37 to 65 is disclosed, wherein the coding data rate comprises a Modulation and Coding Scheme.

In Example 70, the apparatus for multiuser uplink power control of any of examples 37 to 69 is disclosed, wherein the one or more processors are further configured to estimate a received signal power and a packet error rate for one of the plurality of stations in the first subset based on the received subset uplink transmission.

In Example 71, the apparatus for multiuser uplink power control of any one of examples 37 to 70 is disclosed, wherein the one or more processors are further configured to estimate a received signal power and a packet error rate for one of the plurality of stations in the first subset based on the received subset uplink transmission.

In Example 72, the apparatus for multiuser uplink power control of example 71 is disclosed, wherein the predetermined packet error rate threshold is ten percent; the coding data rate is a Modulation and Coding Scheme; and the factor is three Modulation and coding scheme indexes.

In Example 73, a Means for multiuser uplink power control is disclosed comprising:
A transceiving means, configured to receive a multiuser uplink calibration transmission from a plurality of stations; and
One or more processing means, configured to group the plurality of stations into a plurality of subsets based on a subset characteristic; receive a subset optimization transmission from a first subset according to a subset rule; and determine a first calibrated coding data rate and a first calibrated target uplink transmit power for a station in the first subset based on the subset optimization transmission.

In Example 74, the Means for multiuser uplink power control of example 73 is disclosed, wherein the coding data rate is a Modulation and Coding Scheme ("MCS") and Number of Spatial Streams ("NSS") rate Index Level.

In Example 75, the Means for multiuser uplink power control of examples 73 or 74 is disclosed, wherein the subset characteristic is a binary characteristic creating a first subset and a second subset, and wherein the subset rule requires that only stations in the first subset or the second subset may transmit at a given time.

In Example 76, the Means for multiuser uplink power control of example 72 is disclosed, further comprising being configured to assign an uplink transmission unit to each of the plurality of stations within the first subset, wherein each assigned uplink transmission unit is separated from all other assigned uplink resource units by at least one resource unit.

In Example 77, the Means for multiuser uplink power control of examples 75 or 76 is disclosed, wherein the first subset and the second subset transmit sequentially.

In Example 78, the Means for multiuser uplink power control of any one of examples 75 to 77 is disclosed, wherein the one or more processing means are further configured to assign the plurality of stations in the first subset to even resource units, and to assign the plurality of stations in the second subset to odd resource units.

In Example 79, the Means for multiuser uplink power control of any one of examples 75 to 78 is disclosed, wherein the one or more processing means are further configured to estimate a received signal power and a packet error rate at a specific resource unit allocation for one of the plurality of stations in the first subset based on the received subset uplink transmission.

In Example 80, the Means for multiuser uplink power control of examples 73 or 74 is disclosed, wherein the subset characteristic is a membership criteria in a signal to interference plus noise ratio limited service group, an access point transmission noise floor limited service group, or a access point maximum received signal strength indicator limited service group, and wherein the subset rule is that only one service group may transmit at a given time.

In Example 81, the Means for multiuser uplink power control of examples 73 or 74 is disclosed, wherein the subset characteristic is a membership criteria in a signal to interference plus noise ratio service group, a power amplifier noise limited service group, or a received signal strength indicator noise service group, and wherein the subset rule is that each station in a single service group must transmit at a given time.

In Example 82, the Means for multiuser uplink power control of examples 73 or 74 is disclosed, wherein the subset characteristic is a membership criteria in a signal to interference plus noise ratio service group, a power amplifier noise limited service group, or a received signal strength indicator noise service group, and wherein the subset rule is that each station in a service group is assigned a specific uplink transmit resource unit.

In Example 83, the Means for multiuser uplink power control of any one of examples 80 to 82 is disclosed, wherein a group accumulated common error vector magnitude level is less than a noise level at reception.

In Example 84, the Means for multiuser uplink power control of any one of examples 80 to 83 is disclosed, wherein a group accumulated common error vector magnitude level has a positive power amplifier noise delta.

In Example 85, the Means for multiuser uplink power control of any one of examples 80 to 84 is disclosed, wherein a service group is a signal to interference plus noise ratio limited service group ("SNIR Limited Service Group").

In Example 86, the Means for multiuser uplink power control of example 85 is disclosed, wherein the one or more processing means are further configured to estimate a group accumulated common mutual noise level according to an uplink transmission of one or more stations in the SNIR Limited Service Group, wherein the group accumulated common mutual noise level is estimated based on a normalized maximum received signal strength indicator, a receiver noise level, and a station maximum received signal strength indicator.

In Example 87, the Means for multiuser uplink power control of examples 85 or 86 is disclosed, wherein the one or more processing means are further configured to assign an optimized coding data rate and an optimized target uplink transmit power to a station in the service group according to the group accumulated common mutual noise level.

In Example 88, the Means for multiuser uplink power control of examples 86 or 87 is disclosed, wherein the one or more processing means are further configured to determine the group accumulated common mutual noise level based on estimation of a common accumulated error vector magnitude among the plurality of stations in the first subset, and wherein the common accumulated error vector magnitude is separated from the receiver noise level of the access point by a target noise delta.

In Example 89, the Means for multiuser uplink power control of any one of examples 80 through 84 is disclosed, wherein a service group is an Access Point Reception Noise Floor Limited Service Group ("AP RX Noise Floor Limited Service Group"), and wherein a station in the AP RX Noise Floor Limited Service Group is principally limited by one or more other stations in the AP RX Noise Floor Limited Service Group.

In Example 90, the Means for multiuser uplink power control of example 89 is disclosed, wherein the one or more processing means are further configured to determine an Access Point's reception noise floor delta as a difference between a common accumulated error vector magnitude and a minimal reception noise floor level, and to assign a station in the AP RX Noise Floor Limited Service Group an optimized target uplink transmit power that corresponds with an accumulated common error vector magnitude of the AP RX Noise Floor Limited Service Group.

In Example 91, the Means for multiuser uplink power control of example 89 or 90 is disclosed, wherein the one or more processing means are further configured to assign a station in the AP RX Noise Floor Limited Service Group an optimized coding data rate according to at least a reception noise floor delta of the access point.

In Example 92, the Means for multiuser uplink power control of any one of examples 89 through 91 is disclosed, wherein the one or more processing means are further configured to determine a group accumulated common mutual noise level based on a common accumulated error vector magnitude among the plurality of stations in the first subset, and wherein the common accumulated error vector magnitude is separated from a minimum station transmit noise level by a reception noise floor delta of an access point.

In Example 93, the Means for multiuser uplink power control of any one of examples 80 through 84 is disclosed, wherein a service group is an Access Point Maximum Received Signal Strength Indicator Limited Service Group ("AP Max RSSI Limited Service Group").

In Example 94, the Means for multiuser uplink power control of example 93 is disclosed, wherein the one or more processing means are further configured to estimate a common received signal strength indicator limitation of the plurality of stations of the service group, and to assign a station an optimized target uplink transmit power, wherein an aggregate of an estimated optimized accumulated uplink target transmit power corresponds to an accumulated common received signal strength indicator limitation.

In Example 95, the Means for multiuser uplink power control of examples 93 or 94 is disclosed, wherein the one or more processing means are further configured to assign a station in the AP Max RSSI Limited Service Group with an optimized coding data rate according to a target common accumulated received signal strength indicator.

In Example 96, the Means for multiuser uplink power control of example 94 or 95 is disclosed, wherein the one or more processing means are further configured to determine the optimized target uplink transmit power or optimized coding data rate based on a common error vector magnitude among the plurality of stations in the first subset, and wherein the common error vector magnitude corresponds to the maximum uplink transmit power of a station in the first subset.

In Example 97, the Means for multiuser uplink power control of any one of examples 80 through 96 is disclosed, wherein the one or more processing means are further configured to compare a signal to noise ratio for a station with a required signal to noise ratio, and wherein the signal to noise ratio is lower than the required signal to noise ratio, to reduce the coding data rate by a predetermined factor.

In Example 98, the Means for multiuser uplink power control of example 97 is disclosed, wherein the coding data rate is a NSS and Modulation and Coding Scheme, and wherein the factor by which the Modulation and Coding Scheme index is reduced is three.

In Example 99, the Means for multiuser uplink power control of any one of examples 80 through 96 is disclosed, wherein the one or more processing means are further configured to estimate a target long term packet error rate for a station, and where the estimated target long term packet error rate is lower than a predetermined packet error rate threshold, reducing the STA coding data rate by a predetermined factor.

In Example 100, the Means for multiuser uplink power control of example 99 is disclosed, wherein the predetermined packet error rate threshold is ten percent; the coding data rate is a Modulation and Coding Scheme plus a Number of Spatial Streams ("NSS"); and the factor is three Modulation and coding scheme and NSS indexes.

In Example 101, the Means for multiuser uplink power control of any one of examples 80 through 100 is disclosed, wherein the one or more processing means are further configured to determine the subset characteristic from the multiuser uplink calibration transmission.

In Example 102, the Means for multiuser uplink power control of any one of examples 73 to 101 is disclosed, wherein the subset characteristic comprises a limitation based on access point noise.

In Example 103, the Means for multiuser uplink power control of any one of examples 73 to 102 is disclosed, wherein the subset characteristic comprises a limitation based on an access point maximum reception level.

In Example 104, the Means for multiuser uplink power control of any one of examples 73 to 103 is disclosed, wherein the subset characteristic is an absence of a noise limitation.

In Example 105, the Means for multiuser uplink power control of any one of examples 73 to 104 is disclosed, wherein the coding data rate comprises a Modulation and Coding Scheme.

In Example 106, the Means for multiuser uplink power control of any of examples 73 to 105 is disclosed, wherein the one or more processing means are further configured to estimate a received signal power and a packet error rate for one of the plurality of stations in the first subset based on the received subset uplink transmission.

In Example 107, the Means for multiuser uplink power control of any one of examples 73 to 106 is disclosed, wherein the one or more processing means are further configured to estimate a received signal power and a packet error rate for one of the plurality of stations in the first subset based on the received subset uplink transmission.

In Example 108, the Means for multiuser uplink power control of example 107 is disclosed, wherein the predetermined packet error rate threshold is ten percent; the coding data rate is a Modulation and Coding Scheme; and the factor is three Modulation and coding scheme indexes.

In Example 109, a non-transient computer readable medium is disclosed containing program instructions for causing a computer to perform the method of: receiving a multiuser uplink calibration transmission from a plurality of stations; grouping the plurality of stations into a plurality of subsets based on a subset characteristic; receiving a subset optimization transmission from a first subset according to a subset rule; and calculating a first calibrated coding data rate and a first calibrated target uplink transmit power for a station in the first subset based on the subset optimization transmission.

In Example 110, a non-transient computer readable medium is disclosed containing program instructions for causing a computer to perform the method of any of examples 1 through 36.

What is claimed is:

1. A multiuser uplink power control apparatus comprising:
    a transceiver, configured to receive a multiuser uplink calibration transmission from a plurality of stations; and
    one or more processors, configured to group the plurality of stations into a plurality of subsets including at least a first subset and a second subset based on a subset characteristic;
    receive a subset optimization transmission from the first subset according to a subset rule; and determine a first calibrated coding data rate and a first calibrated target uplink transmit power for a station in the first subset based on the subset optimization transmission;
    wherein the one or more processors are configured to assign an uplink resource unit for a simultaneous transmission of each of the plurality of stations within the first subset, wherein each of the plurality of stations is assigned an uplink resource unit, and wherein each assigned uplink resource unit is separated from another assigned uplink resource units within the subset by at least one uplink resource unit, and wherein the first subset and the second subset are assigned to transmit sequentially.

2. The multiuser uplink power control apparatus of claim 1, wherein the coding data rate comprises a Modulation and Coding Scheme ("MCS") and Number of Spatial Streams ("NSS") rate Index Level.

3. The multiuser uplink power control apparatus of claim 1, wherein the subset characteristic is a membership in a signal to interference plus noise ratio limited service group ("SNIR Limited Service Group"), wherein the one or more processors are further configured to estimate a group accumulated common mutual noise level according to an uplink transmission of one or more stations in the SNIR Limited Service Group, wherein the group accumulated common mutual noise level is estimated based on at least a normalized maximum received signal strength indicator, a receiver noise level, or a station maximum received signal strength indicator; and wherein the subset rule is that a single service group may transmit at a given time.

4. The multiuser uplink power control apparatus of claim 3, wherein the one or more processors are further configured to assign an optimized coding data rate and an optimized target uplink transmit power to a station in the service group according to the group accumulated common mutual noise level, and wherein the one or more processors are further configured to determine the group accumulated common mutual noise level based on estimation of a common accumulated error vector magnitude among the plurality of stations in the first subset, and wherein the common accumulated error vector magnitude is separated from the receiver noise level of the access point by a target noise delta.

5. The multiuser uplink power control apparatus of claim 1, wherein the subset characteristic is a membership in an Access Point Reception Noise Floor Limited Service Group ("AP RX Noise Floor Limited Service Group"); wherein a station in the AP RX Noise Floor Limited Service Group is principally limited by one or more other stations in the AP RX Noise Floor Limited Service Group, and wherein the subset rule is that a single service group may transmit at a given time.

6. The multiuser uplink power control apparatus of claim 5, wherein the one or more processors are further configured to determine an Access Point's reception noise floor delta as a difference between a common accumulated error vector magnitude and a minimal reception noise floor level, and to assign a station in the AP RX Noise Floor Limited Service Group an optimized target uplink transmit power that corresponds with an accumulated common error vector magnitude of the AP RX Noise Floor Limited Service Group, and to assign a station in the AP RX Noise Floor Limited Service Group an optimized coding data rate according to at least a reception noise floor delta of the access point.

7. The multiuser uplink power control apparatus of claim 6, wherein the one or more processors are further configured to determine a group accumulated common mutual noise level based on a common accumulated error vector magnitude among the plurality of stations in the first subset, and wherein the common accumulated error vector magnitude is separated from a minimum station transmit noise level by a reception noise floor delta of an access point.

8. The multiuser uplink power control apparatus of claim 1, wherein the subset characteristic is a membership in a an Access Point Maximum Received Signal Strength Indicator Limited Service Group ("AP Max RSSI Limited Service Group"); wherein the one or more processors are further configured to estimate a common received signal strength indicator limitation of the plurality of stations of the service group, and to assign a station an optimized target uplink transmit power; wherein an aggregate of an estimated optimized accumulated uplink target transmit power corresponds to an accumulated common received signal strength indicator limitation; and wherein the subset rule is that a single service group may transmit at a given time.

9. The multiuser uplink power control apparatus of claim 8, wherein the one or more processors are further configured to assign a station in the AP Max RSSI Limited Service Group with an optimized coding data rate according to a target common accumulated received signal strength indicator and to determine the optimized target uplink transmit power or optimized coding data rate based on a common error vector magnitude among the plurality of stations in the first subset, and wherein the common error vector magnitude corresponds to the maximum uplink transmit power of a station in the first subset.

10. The multiuser uplink power control apparatus of claim 1, wherein the one or more processors are further configured to estimate a target long term packet error rate for a station, and where the estimated target long term packet error rate is lower than a predetermined packet error rate threshold, reducing the STA coding data rate by a predetermined factor, wherein the predetermined packet error rate threshold is about 10 percent; the coding data rate is a Modulation and Coding Scheme plus a Number of Spatial Streams ("NSS"); and the factor is three Modulation and coding scheme and NSS indexes.

11. A method of multiuser uplink power control comprising:
receiving a multiuser uplink calibration transmission from a plurality of stations;
grouping the plurality of stations into a plurality of subsets including at least a first subset and a second subset based on a subset characteristic;
receiving a subset optimization transmission from the first subset according to a subset rule; and
determining a first calibrated coding data rate and a first calibrated target uplink transmit power for a station in the first subset based on the subset optimization transmission
further comprising assigning an uplink resource unit for a simultaneous transmission of each of the plurality of stations within the first subset, wherein each of the plurality of stations is assigned an uplink resource unit, and wherein each assigned uplink resource unit is separated from another assigned uplink resource units within the subset by at least one uplink resource unit, and wherein the first subset and the second subset are assigned to transmit sequentially.

12. The method of multiuser uplink power control of claim 11, wherein the coding data rate comprises a Modulation and Coding Scheme ("MCS") and Number of Spatial Streams ("NSS") rate Index Level, and where the subset characteristic is a binary characteristic creating a first subset and a second subset, and wherein the subset rule requires that only stations in the first subset or the second subset may transmit at a given time.

13. The method of multiuser uplink power control of claim 12, further comprising assigning an uplink transmission unit to each of the plurality of stations within the first subset, wherein each assigned uplink resource unit ("RU"), is separated from all other assigned uplink resource units by at least one resource unit.

14. The method of multiuser uplink power control of claim 11, wherein the subset characteristic is a membership in a signal to interference plus noise ratio limited service group ("SNIR Limited Service Group"), further comprising estimating a group accumulated common mutual noise level according to an uplink transmission of one or more stations in the SNIR Limited Service Group, wherein the group accumulated common mutual noise level is estimated based on at least one of normalized maximum received signal strength indicator, a receiver noise level, or a station maximum received signal strength indicator; and wherein the subset rule is that only one service group may transmit at a given time.

15. The method of multiuser uplink power control of claim 14, further comprising assigning an optimized coding data rate and an optimized target uplink transmit power to a station in the service group according to the group accumulated common mutual noise level, wherein the group accumulated common mutual noise level is determined based on estimation of a common accumulated error vector magnitude among the plurality of stations in the first subset, and wherein the common accumulated error vector magnitude is separated from the receiver noise level of the access point by a target noise delta.

16. The method of multiuser uplink power control of claim 15, wherein a group accumulated common error vector magnitude level is less than a noise level at reception, and wherein a group accumulated common error vector magnitude level has a positive power amplifier noise delta.

17. The method of multiuser uplink power control of claim 11, wherein the subset characteristic is a membership in an Access Point Reception Noise Floor Limited Service Group ("AP RX Noise Floor Limited Service Group"), and wherein a station in the AP RX Noise Floor Limited Service Group is principally limited by one or more other stations in the AP RX Noise Floor Limited Service Group, further comprising determining a Access Point's reception noise floor delta as a difference between a common accumulated error vector magnitude and a minimal reception noise floor level, and assigning a station in the AP RX Noise Floor Limited Service Group an optimized target uplink transmit power that corresponds with an accumulated common error vector magnitude of the AP RX Noise Floor Limited Service Group; and wherein the subset rule is that only one service group may transmit at a given time.

18. The method of multiuser uplink power control of claim 17, further comprising assigning a station in the AP RX Noise Floor Limited Service Group an optimized coding data rate according to at least a reception noise floor delta of the access point, wherein a group accumulated common mutual noise level is determined based on a common accumulated error vector magnitude among the plurality of stations in the first subset, and wherein the common accumulated error vector magnitude is separated from a minimum station transmit noise level by a reception noise floor delta of an access point.

19. The method of multiuser uplink power control of claim 11, wherein the subset characteristic is a membership in an Access Point Maximum Received Signal Strength Indicator Limited Service Group ("AP Max RSSI Limited Service Group") further comprising estimating a common received signal strength indicator limitation of the plurality of stations of the service group, and assigning a station an optimized target uplink transmit power, wherein an aggregate of an estimated optimized accumulated uplink target transmit power corresponds to an accumulated common received signal strength indicator limitation, further comprising assigning a station in the AP Max RSSI Limited Service Group with an optimized coding data rate according to a target common accumulated received signal strength indicator; and wherein the subset rule is that only one service group may transmit at a given time.

20. A means for multiuser uplink power control comprising:
  a transceiving means for receiving a multiuser uplink calibration transmission from a plurality of stations; and
  one or more processing means for grouping the plurality of stations into a plurality of subsets including at least a first subset and a second subset based on a subset characteristic; receiving a subset optimization transmission from the first subset according to a subset rule; and determining a first calibrated coding data rate and a first calibrated target uplink transmit power for a station in the first subset based on the subset optimization transmissions;
  further comprising assigning an uplink resource unit for a simultaneous transmission of each of the plurality of stations within the first subset, wherein each of the plurality of stations is assigned an uplink resource unit, and wherein each assigned uplink resource unit is separated from another assigned uplink resource units within the subset by at least one uplink resource unit, and wherein the first subset and the second subset are assigned to transmit sequentially.

* * * * *